US007652997B2

(12) United States Patent
Rekimoto

(10) Patent No.: US 7,652,997 B2
(45) Date of Patent: Jan. 26, 2010

(54) DATA COMMUNICATION SYSTEM, DATA COMMUNICATION APPARATUS AND DATA COMMUNICATION METHOD, CONNECTION ESTABLISHMENT METHOD AND APPARATUS, CONNECTION ESTABLISHMENT SYSTEM, AND COMPUTER PROGRAM THEREOF

(75) Inventor: Junichi Rekimoto, Tokyo (JP)

(73) Assignee: Sony Corporation (JP)

( * ) Notice: Subject to any disclaimer, the term of this patent is extended or adjusted under 35 U.S.C. 154(b) by 675 days.

(21) Appl. No.: 10/826,060

(22) Filed: Apr. 15, 2004

(65) Prior Publication Data

US 2004/0215815 A1 Oct. 28, 2004

(30) Foreign Application Priority Data

Apr. 22, 2003 (JP) ............................. 2003-116593

(51) Int. Cl.
*G01R 31/08* (2006.01)
(52) U.S. Cl. .................................. 370/236; 370/395.31
(58) Field of Classification Search ................. 370/386, 370/441, 460; 345/163, 156
See application file for complete search history.

(56) References Cited

U.S. PATENT DOCUMENTS

| 2,292,387 | A * | 8/1942 | Markey et al. ................. 380/34 |
| 6,806,866 | B2 * | 10/2004 | Benayoun et al. ........... 345/163 |
| 6,865,371 | B2 * | 3/2005 | Salonidis et al. ........... 455/41.1 |

| 2002/0044549 | A1 * | 4/2002 | Johansson et al. ........... 370/386 |
| 2004/0179545 | A1 * | 9/2004 | Erola et al. ................. 370/449 |

FOREIGN PATENT DOCUMENTS

| JP | 1-198897 A | 8/1989 |
| JP | 11-008625 A | 1/1999 |
| JP | 2001-086231 A | 3/2001 |
| JP | 2002-073565 A | 3/2002 |
| JP | 2002-159053 A | 5/2002 |
| JP | 2002-374261 A | 12/2002 |
| WO | 03/053007 A1 | 6/2003 |

OTHER PUBLICATIONS

Bluetooth™ Security White Paper. Christian Gehrmann, Apr. 19, 2002 Revision 1.0 http://grouper.ieee.org/groups/1451/5/Comparison%20of%20PHY/Bluetooth_24Security_Paper.pdf.*

* cited by examiner

*Primary Examiner*—Chirag G Shah
*Assistant Examiner*—Nima Mahmoudzadeh
(74) *Attorney, Agent, or Firm*—Lerner, David, Littenberg, Krumholz & Mentlik, LLP

(57) ABSTRACT

A user interface device for specifying network connection in a straightforward manner between information apparatus is provided. When a user wishes to connect two apparatuses, connection buttons on each apparatus are pressed down at the same time, with pressing then being released at the same time. Packets containing timing of pressing down and release of the connection buttons are then transmitted from each apparatus using multicasting. The times included in the packets are then compared with those recorded within the apparatuses, so as to enable both apparatuses to correctly identify each other. This connection method is scaleable as being able to detect duplicate connection requests. It is therefore possible to establish secure connection by exchanging public keys.

22 Claims, 14 Drawing Sheets

(a)

(b)

(c)

(a) CONNECTION REQUEST ACCEPTED (b) CONNECTION NOT ACCEPTED (c) COLLISION (CONNECTION NOT ACCEPTED)

(d) CONNECTION REQUEST ACCEPTED (TWO EVENTS)

SIMULTANEOUS PRESSING

PRINTING

DATA COMMUNICATION SYSTEM, DATA COMMUNICATION APPARATUS AND DATA COMMUNICATION METHOD, CONNECTION ESTABLISHMENT METHOD AND APPARATUS, CONNECTION ESTABLISHMENT SYSTEM, AND COMPUTER PROGRAM THEREOF

CROSS REFERENCE TO RELATED APPLICATIONS

The present document is based on Japanese Priority Application JP2003-116593 filed in the Japanese Patent Office on Apr. 22, 2003, the contents in which being incorporated herein by reference to the extent permitted by law.

BACKGROUND OF THE INVENTION

1. Field of the Invention

The present invention relates to a data communication system, data communication apparatus and data communication method, connection establishment method and connection establishment apparatus, connection establishment system, and computer program for carrying out data communication with another communication counterpart for which identification information cannot be discerned on a communication medium, and particularly relates to a data communication system, data communication apparatus and data communication method, connection establishment method and connection establishment apparatus, connection establishment system, and computer program for establishing a connection using immediate network connection instructions in a straightforward manner with another communication counterpart existing in the real world but for which identification information cannot be discerned on a communication medium.

More specifically, the present invention relates to a data communication system, data communication apparatus and data communication method, connection establishment method and connection establishment apparatus, connection establishment system, and computer program for establishing a secure network connection in a straightforward manner, that is both intuitive and immediate by operation of a user interface, between information apparatuses in a communication environment where the network configuration is complex and changes dynamically, and, more specifically, relates to a data communication system, data communication apparatus and data communication method, connection establishment method and connection establishment apparatus, connection establishment system, and computer program capable of enacting scaleable network connections by utilizing a typical user interface such as a keyboard, etc.

2. Related Art

In an era when information processing technology and information communication technology are developing fast, information apparatuses, starting from personal computers (PCs) and mobile information terminals, have become ubiquitous in the real world such as in offices and households etc. In this kind of environment, it is expected that "Ubiquitous Computing", where it is possible to obtain desired information anytime, anywhere, will be realized in short time.

For example, it is common that input/output apparatuses are used while connected to a network, from PCs and printers, TVs, video recorders, digital cameras, PDAs (Personal Digital Assistants), mobile telephones, telephones, game apparatuses, and mice, keyboards and headsets. A mixture of wired (Ethernet (registered trademark) and networks with powered lines etc.) and wireless (IEEE802.11 etc.) media, for example, may be utilized as network media.

SUMMARY OF THE INVENTION

The concept of ubiquitous computing is that the computing environment that can be utilized is the same wherever a person moves to. As the concept is to achieve computing "anytime, anywhere", the ultimate pursuit in ubiquitous computing would mean that information terminals would by no means be necessary for establishing communication.

However, when it is intended to designate computers or peripheral apparatuses (i.e. targets) constituting destinations for data transfer on a network or to obtain information relating to objects in the real world, it is necessary to know the name (or resource identification information such as apparatus specific ID or network address, host name, or URL (Uniform Resource Locator) etc.) of such a target(s) even when the communication counterpart is in front of the user's very eyes. Namely, expressing this in relation to user operations, cooperation between computers can only take place in an indirect form, which is both complex and lacking in intuitiveness. In other words, it is important to provide an intuitive user interface enabling a user to reliably establish network connections.

In recent times, "Ad-hoc" communication enabling direct asynchronous wireless communication between arbitrary terminals has attracted attention. For example, "Ad-hoc" communication is adopted in the cases below.

(1) Documents within information terminals such as PDAs etc. are outputted as hard copy using a printer that is in front of the user's eyes.

(2) Presentation material is displayed on a screen in a meeting room. Data is transferred via a wireless network from a user's notebook computer to a computer utilized for presentation purposes.

(3) The PDA constitutes a remote control unit for a television receiver in front of the user's eyes.

(4) Transferring of files between groups of people using public wireless services such as "hotspots" etc. It is worth noting that it is also preferable for the data transfer path to be secure against data leakage, stealing, eavesdrop, unauthorized access, etc.

Typically, a unique IP address or machine name is used for each individual apparatus to specify themselves. However, an address-based method of designating a communication counterpart (target) is not efficient in a communication environment where the network configuration is complex and changes dynamically. For example, sequential checking of IP addresses of target devices such as printers is annoying. Further, configurations where network addresses are automatically allocated to devices starting from DHCP (Dynamic Host Configuration Protocol) have become widespread but the situation is further complicated with regard to the user from the aforementioned viewpoint of identifying communication counterparts.

For example, several systems where attempts are made at connecting between neighboring apparatuses using physical actions have been proposed. For example, refer to non-patent documents Want, R., etc. al, "Bridging physical and virtual worlds with electronic tags" (In: CHI'99 Proceedings. (1999) pp. 370-377); Rekimoto et. al, "Augmented Surface: A spatially continuous workspace for hybrid computing environment" (In Proceedings of ACM CHI'99. (1999) pp. 378-385); and Swindells, C. et. al "That one there! Pointing to establish device identity." (In: Symposium on User Interface Software and Technology (UIST'02). (2002) pp. 151-160). With these systems, however, it is necessary to newly provide recognition sensors such as RFID (Radio Frequency IDentification) tags and infrared beams and bar codes etc. It is therefore difficult to say that these are effective methods for apparatus where it is not possible to mount those sensors.

Recently, methods for accessing resources on networks using names that are easy to grasp such as "Kate's Computer" or "Copy Room Printer" have been proposed (for example, in non-patent document Zero Configuration Networking:). In such case, it is possible for the user to specify the communication counterpart by selecting a menu item. However, this involves going to a great deal of time consuming effort in order to maintain an extremely large name list.

Further, it is not possible for these methods to co-exist with digital apparatus with display screens for headsets and GUI (Graphical User Interface) environments where selection functions are not provided.

The present invention has been conceived in order to cope with the problems like those presented above and it is aimed to provide a data communication system, data communication apparatus and data communication method, connection establishment method and connection establishment apparatus, connection establishment system, and computer program capable of establishing a connection using immediate network connection instructions in a straightforward manner with another actual communication counterpart existing in the real world in front of the user's eyes but for which identification information is not easy to be discerned on a communication medium.

It is a further aim of the present invention to provide a data communication system, data communication apparatus and data communication method, connection establishment method and connection establishment apparatus, connection establishment system, and computer program capable of establishing a secure network connection in a straightforward manner that is both intuitive and immediate by operation of a user interface, between information apparatus in a communication environment where the network configuration is complex and changes dynamically.

It is a still further aim of the present invention to provide a data communication system, data communication apparatus and data communication method, connection establishment method and connection establishment apparatus, connection establishment system, and computer program capable of realizing scaleable network connections by utilizing a typical user interface such as a keyboard, etc.

In order to approach the aforementioned problems, in a first aspect of the present invention, a data communication system enabling a plurality of data communication apparatuses to carry out data communication via a communication medium, with apparatus carrying out data communication being equipped with user interfaces for accepting user operations, and with a user operation and release of user operation with respect to part of a users interface being allocated as connection designation section configured to designate network connections, the system including: timing information sharing section configured to sharing timing information relating to the user operation and releasing of the user operation between apparatus constituting communication counterparts in response to the simultaneous performing of user operations and release of user operations by connection designation section of apparatus on opposing sides constituting fellow communication counterparts; and searching section configured to searching for and specifying as communication counterparts apparatuses sharing the same timing information relating to a user operation and release of a user operation on the communication medium.

Here, the word "system" refers to a plurality of devices (or function modules for implementing specific functions) which are logically gathered together, and there is no preference as to whether each device and function module is within a single encapsulation or not.

A first time difference constituted by a time difference of a first time at which a first user operation is carried out at this user interface and a second time at which a second user operation is carried out is acquired at the side of first information apparatus in the case of establishing a similarly connection between first information apparatus and second information apparatus, a second time difference constituted by a time difference of a third time at which a first user operation is carried out at this user interface and a fourth time at which a second user operation is carried out is acquired at the side of the second information apparatus.

Physical user operations applied respectively to the user interfaces of the first and second information apparatus are a series of operations carried out by the user. These therefore have synchronicity having a certain amount of error and serve to constitute timing information shared between the first and second information apparatuses. Connections are therefore established between the first and second information apparatus based on the first and second time differences.

Namely, the searching section collectively transmits connection request packets containing user operation and release of user operation timings for each individual apparatus, and reads timing information relating to user operations and release of user operations from connection request packets received from other apparatus. This timing information is then compared with timing information for a user operation and release of a user operation held by an individual apparatus itself, with identification then taking place between apparatuses by matching this information.

According a preferred embodiment of the present invention, when a user intends to establish a network connection between specific apparatus, user interfaces allocated as being for connection requests at both apparatuses, i.e. SyncTap buttons may be pressed down simultaneously and this pressing may then be released simultaneously. By carrying out this user operation in a synchronous manner and mutually checking the timing, mutual identification can take place and network connection can begin. This is to say that it is possible to establish network connections between information apparatuses in a straightforward manner using user interface operations that are both intuitive and immediate.

For example, an apparatus own network identification information and time interval from a user operation until release of the user operation is included in the connection request packet.

In such case, it is possible to identify communication counterparts by comparing timing information. This is to say that communication counterpart identifying means is capable of identifying whether or not a transmission source of a connection request packet is a communication counterpart by determining whether or not a difference of a time from releasing of a user operation to the connection designation section of an own device to a time of receiving a connection request packet is less than a prescribed limit of error, and determining whether or not a difference between a time interval from a user operating the connection designation section to the user operation being released held in the timing information storage section and the time interval included in the received connection request packet is a limit of error.

In this communication counterpart identifying method, it is not necessary for the system timers to be synchronized between apparatuses because communication counterparts are identified using differences in time information managed at each individual apparatus, not by using times given at each individual apparatus.

Further, by calculating synchronicity using the two times of the time a user operates the connection designation section and the time of releasing of the user operation when making a connection between two apparatuses, the likelihood of a third party intervening at exactly the same time is kept sufficiently low.

The connection designation section is a designating means allocated to part of a typical user interface such as a keyboard. It is therefore necessary to determine whether a user operation of the connection designation section is a usual (normal) user interface operation or a network connection request. For example, an operation is processed as a network connection request if differing from a usual user interface operation.

For example, an Esc key on a keyboard may be used as the connection designation section. When a time interval from a user operation of the connection designation section to the user releasing the device is less than a prescribed value, such operation is processed as a usual interface operation, and when exceeding the prescribed value, such operation is processed as a network connection request.

A Shift key may also be similarly allocated as a SyncTap button. In cases where the Shift key is pressed down and then released without being used in combination with any other keys, these operations may be processed as SyncTap button operations. Other cases may then be processed as normal Shift key operations.

Further, the data communication apparatus of the present invention may further comprise collision-detecting section configured to detecting collisions in response to the arrival of two or more connection request packets within a prescribed time from user operation of the connection designation section being released.

There may further be provided connection request retry section configured to request a user to retry operation of the connection designation section in response to the detection of collision.

It is also possible to store all network identification information included in each connection request packet received at time of a collision and accept only connection request packets from transmission sources possessing stored network identification information at the time of retrying the connection request.

According to this collision detection/collision avoidance method, even if a SyncTap operation fails a first time because of a collision with another network connection establishment operation, at the time of a second attempt, the connection destination candidates have already been dramatically reduced, so that a practically collision-free situation is attained. The network connection method of the present invention is therefore scaleable and is applicable to communication environments where a large number of data communication apparatuses are clustered on a single LAN segment.

A data communication apparatus according to a preferred embodiment of the present invention may be further equipped with a generator for generating public keys under a public key encryption method, with packet transmitter, then transmitting connection request packets containing public keys.

In such case, a first type of information for encryption key generation is transmitted using a method receivable by the second individual apparatus, or a second type of information for encryption key generation transmitted by the second information apparatus is acquired. After a connection is established, encryption keys are generated based on the type information, and communication is carried out using encryption processing based on encryption keys.

Namely, public keys are exchanged between communication counterparts, with these public keys then being used to calculate shared secret session keys used in encrypted communication. The public keys referred to here are, for example, public keys under a Diffie-Hellman method.

The Diffie-Helman algorithm is typically for resolving the "man-in-the-middle" (anybody can make a connection) problem and an additional method is required to verify an end point of the communication path. With respect to this, in order for a "man-in-the-middle", i.e., a third party to get in between in the case of utilizing the network connection method of the present invention, it is necessary to block all of the multicast packets and transmit counterfeit packets in their place. This makes improper access extremely difficult.

A data communication apparatus according to a preferred embodiment of the present invention may also be equipped with means for providing a user with some kind of feedback in response to identification of a communication counterpart by the communication counterpart identifying means.

Further, because the network connection method of the present invention is utilized in connecting between adjoining apparatus (i.e. apparatus that can be reached by both hands of the user), the respective apparatus can easily carry out instantaneous feedback with reference to network connections. For example, a message window may be displayed as a pop-up on a display screen, an LED indicator may be made to flash, or feedback may be provided to the user. As a result, concealed man-in-the-middle hosts can easily be detected, and it is possible to obtain sufficient reliability in practical communication environments even with simple public key exchanging methods.

In another preferred embodiment of the present invention, a computer program described in computer-readable form is provided for executing process for establishing connections between information apparatuses, the process including: a step of acquiring a first time difference including a difference between a first time when a first physical operation is carried out on an operation section installed on the apparatus and a second time when a second physical operation is carried out on the operation section, a step of acquiring a second time difference including a difference between a third time, corresponding to the first time, generated by information apparatus constituting a connection destination, and a fourth time corresponding to the second time, and a step of establishing a connection between the first and second information apparatus based on the first and second time differences, wherein the first and second physical operations are a series of operations of the operation sections carried out by the user.

The computer program according to such preferred embodiment of the present invention is defined as a computer program described in computer-readable form capable of implementing prescribed processing on a computer system. In other words, by installing the computer program of the second preferred embodiment of the present invention on a computer system, cooperative action is exhibited by the computer system so that operation results that are the same as those for the data communication system of the first aspect of the present invention can be obtained.

As described in detail above, according to a preferred embodiment of the present invention, there is provided a data communication system, data communication apparatus and data communication method, connection establishment method and connection establishment apparatus, connection establishment system, and computer program capable of establishing a connection using immediate network connection instructions in a straightforward manner with another communication counterpart clearly existing in the real world in front of the user's eyes, but for which identification information cannot be discerned on a communication medium.

Further, according the preferred embodiments of the present invention, there is provided a data communication system, data communication apparatus and data communication method, connection establishment method and connection establishment apparatus, connection establishment system, and computer program capable of establishing a secure network connection in a straightforward manner that is both intuitive and immediate by operation of a user interface, between information apparatus in a communication environment where the network configuration is complex and changes dynamically.

Moreover, according the preferred embodiments of the present invention, there is provided a data communication system, data communication apparatus and data communication method, connection establishment method and connection establishment apparatus, connection establishment system, and computer program capable of realizing scaleable network connections by utilizing a typical user interface such as a keyboard, etc.

Furthermore, according the preferred embodiments of the present invention, it is possible to establish network connections between specific apparatuses according to user operations in a manner that is intuitive and immediate while being simpler using usual apparatuses equipped with a minimum of hardware configuration elements (for example, user-operable buttons) and sensors. It is therefore possible for the network connection method of the present invention to coexist with display screens such as wireless headsets and digital apparatus that is not equipped with a selection function in a GUI environment.

BRIEF DESCRIPTION OF THE DRAWINGS

The above and other objects and features of the present invention will become more readily apparent to those of ordinary skill in the art from the following detailed description taken in conjunction with the accompanying drawings in which.

DESCRIPTION OF THE PREFERRED EMBODIMENTS OF THE INVENTION

Figure 1:
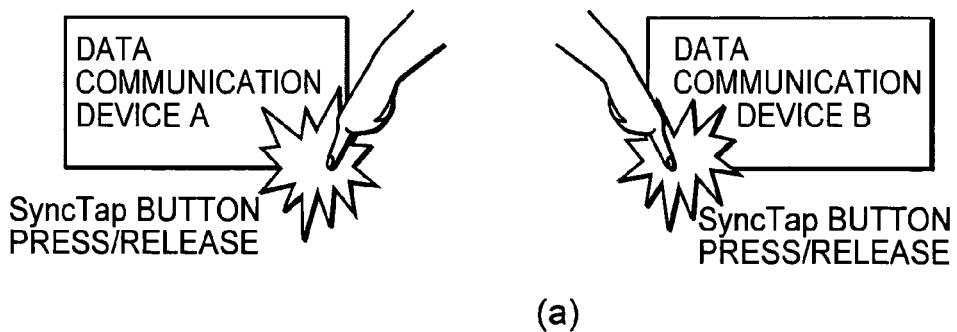
FIG. 1 is a view schematically showing a basic configuration of a data communication system according to a preferred embodiment of the present invention.
Figure 1:
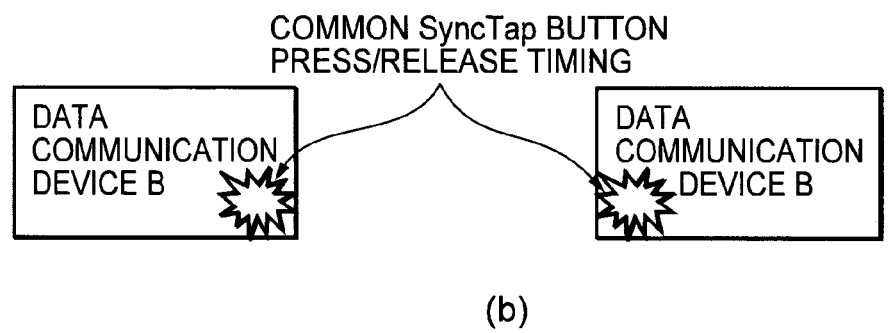
Figure 1:
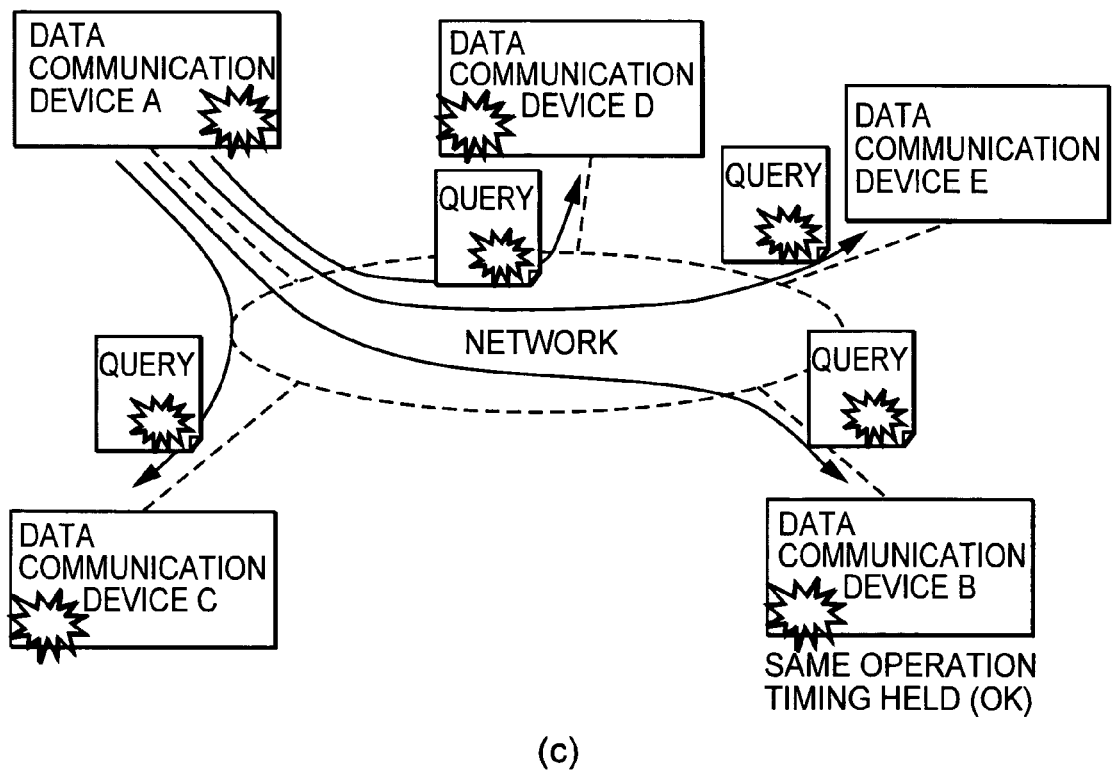

In the following, a detailed description of preferred embodiments of the present invention is given with reference to the drawings.

It is common for input/output apparatuses, from PCs and printers, TVs, video recorders, digital cameras, PDAs, mobile telephones, telephones, game apparatuses, and mice, keyboards and headsets, to be used connected to a network. On the other hand, the operation of designating communication counterparts using network addresses becomes complicated due to the complexity of the network configuration. It is therefore preferable in this kind of ubiquitous environment to have a method where a user can designate a communication counterpart in a more direct manner.

For example, a method may be considered where IP addresses are communicated between apparatus using infrared communication interfaces such as IrDA. In Japanese Patent Laid-open Publication No. 2002-204239 already granted to the current applicant, it is disclosed that separate means (for example, RFID tags, etc.) for carrying out communication only between two connected parties are used together by both parties, with devices employing this kind of communicator as means for exchanging initial information for establishing a wireless connection (the content of this laid-open specification is taken to be incorporated in this specification). In such case, a user directs an infrared beam from one individual information apparatus to another individual apparatus constituting a target or counterpart for communication. This then becomes a trigger, and wireless communication between apparatus is then commenced. It is then preferable to include a one-time session key within the infrared beam in order to establish a secure network connection. However, in order to implement this method, it is necessary for infrared transceivers to be mounted on all of the apparatuses so that, in other words, this may not become widely accepted.

This specification therefore discloses a method for establishing network connections between specific apparatus according to user operations in a manner that is intuitive and immediate while being simpler using usual apparatus equipped with a minimum of hardware configuration elements and sensors.

It is assumed that the apparatus is equipped with at least a single button or command switch or similar operation mechanism or element. This may be a user interface equipped with typical information apparatus such as a keyboard or keypad. This single button may be allocated as a button for specifying a network connection (hereinafter referred to as a "SyncTap" button).

When a user then thinks to establish a network connection between specific apparatuses, the SyncTap buttons of both apparatuses are then simultaneously pressed down and this pressing down is simultaneously released. By carrying out this user operation in a synchronous manner and mutually checking the timing, mutual identification can take place and network connection can begin.

Naturally, the SyncTap button may also be used for other applications. Original key functions are not ignored (described later) when, for example, a keyboard provided in a personal computer is allocated as a SyncTap button.

A. System Configuration

A basic configuration for a data communication system according to a preferred embodiment of the present invention is shown schematically in FIG. 1. In the example shown in the same drawings, two data communication apparatuses A and B constituting communicating parties are mutually connected via a network. The respective data communication apparatuses A and B are both in front of the user's eyes and are capable of sharing the timing of the SyncTap button pressing operation and pressing release operation. However, it is presupposed that each data communication apparatus is completely unaware of the other's network identification information (IP address, etc.).

It is also taken that at a certain time, the user wishes to establish network connections between data communication apparatus A and data communication apparatus B. At this time, the user simultaneously presses down and simultaneously releases the SyncTap buttons of both apparatuses (refer to FIG. 1(a)).

In such case, the data communication apparatuses A and B can be made to share the timing of pressing and releasing pressing of the same SyncTap buttons (refer to FIG. 1(b)). Here, the data communication apparatuses A and B sequentially store times for pressing down and releasing pressing of the SyncTap button at times set by their respective system timers.

After that, each data communication apparatus can identify communication counterparts specified by the user by searching for apparatuses sharing the same SyncTap button pressing and pressing release timing on the network. More specifically, both (or one of) the data communication apparatus A and the data communication apparatus B are capable of searching out desired communication counterparts by performing multicast transmission of network connection requests (queries) containing timing information relating to pressing and releasing of SyncTap buttons stored by themselves over the network (refer to FIG. 1(c)). It is also possible to search for communication counterparts using communication methods other than multicasting.

Such operation of searching for communication counterparts can start directly after the user simultaneously operates the SyncTap buttons of both of the data communication apparatuses. (A configuration may be adopted where execution may take place at any time if the timing of the pressing and releasing of pressing of the SyncTap button is saved even after the corresponding period has elapsed, but a description of this point is omitted from this specification).

Figure 2:
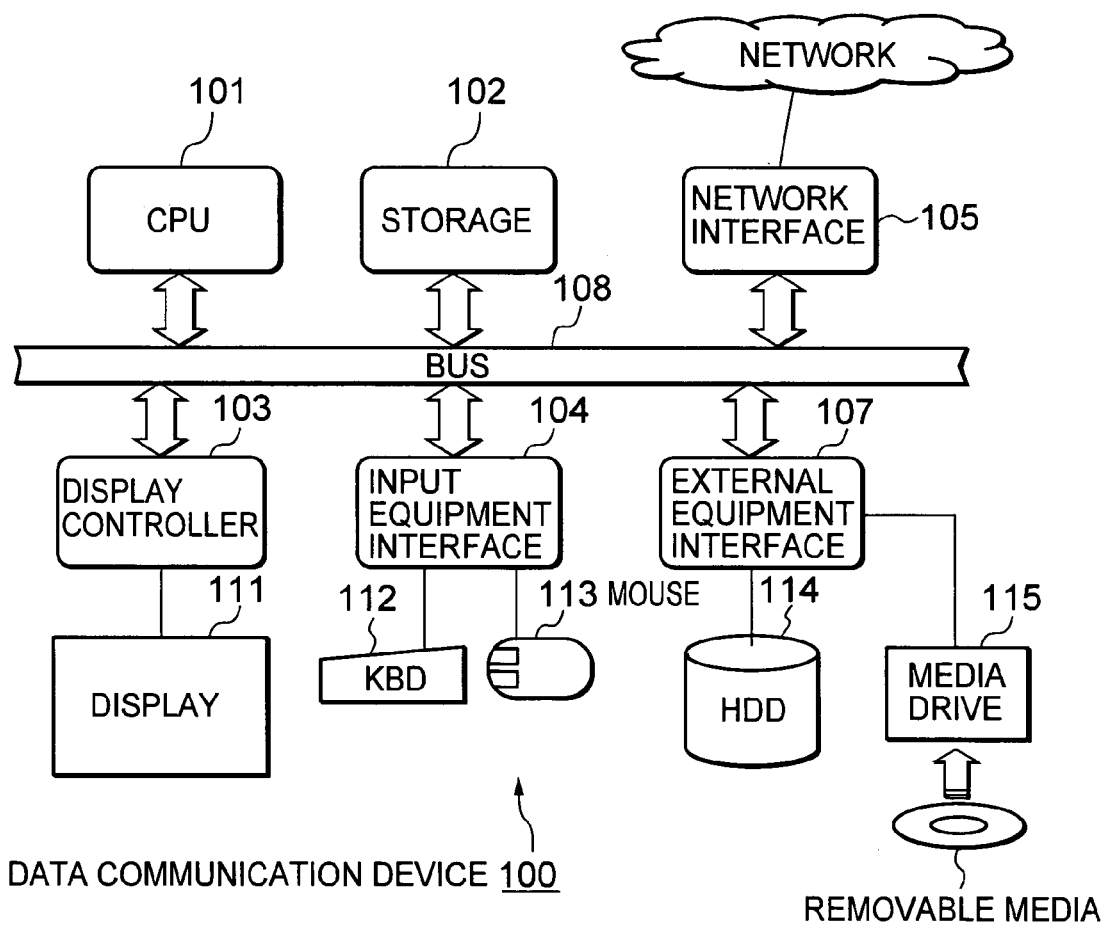
FIG. 2 is a view showing an example of a hardware configuration for a data communication apparatus capable of operating in a data communication system according to a preferred embodiment of the present invention.

An example of a hardware configuration for a data communication apparatus capable of operating in a data communication system of this embodiment is shown in FIG. 2.

A CPU (Central Processing Unit) 101 constituting a main controller of the system 100 executes each type of application under the control of the operating system (OS). The CPU 101 executes application programs for, for example, communication applications, observing and holding user operations of the SyncTap button, and searching for communication counterparts sharing user information for the SyncTap buttons. As shown in FIG. 2, the CPU 101 is mutually connected to other types of apparatus (described later) by the bus 108.

Storage 102 is a storage device for storing program codes executed by the CPU 101 and temporarily storing work data during execution of the programs. It is desired that the storage 102 shown in FIG. 2 is to be understood to include both non-volatile memory such as ROM (Read Only Memory) etc. and volatile memory such as DRAM (Dynamic RAM) etc.

The display controller 103 is a dedicated controller for actual processing of drawing commands issued by the CPU 101. Drawing data processed by the display controller 103 is outputted as images on a display 111 after being written temporarily to, for example, a frame buffer (not shown).

An input apparatus interface 104 is a device for connecting user input apparatus such as a keyboard 112 or a mouse 113 etc. to a computer system 100.

In this preferred embodiment of the present invention, the keyboard 112 or part of another user interface device is allocated as the SyncTap button. When a user then thinks to establish a network connection between specific apparatus, the SyncTap buttons of both apparatuses are then simultaneously pressed down and this pressing down is simultaneously released. As a matter of course, the SyncTap button may also be used for other applications. For example, when one key of the keyboard 112 is allocated as the SyncTap button, the original key function is not ignored.

A network interface 105 is capable of connecting a system 100 to a network such as a LAN (Local Area Network) in accordance with a prescribed communication protocol such as Ethernet (registered trademark) etc. In this preferred embodiment, a data communication apparatus 100 is capable of transmitting network connection requests (multicast packets) via the network interface 105 and is capable of establishing network connections with other data communication apparatuses.

An external apparatus interface 107 is a device for connecting external devices such as a hard disc driver (HDD) 114 and a media driver 115 etc. to the system 100.

The HDD 114 is a (well-known) external storage device mounted with a fixed magnetic disc as a storage medium and is superior to other external storage devices with respect to storage capacity and data transfer speed etc. Putting software programs onto the HDD 114 in an executable state is referred to as "installing" the program onto the system. For example, program code for an operating system to be executed by the CPU 101, application programs, and device drivers etc. are stored in non-volatile memory at the HDD 114. For example, application programs for observing and holding user operations of the SyncTap button, and searching for communication counterparts sharing user information for the SyncTap buttons etc. are installed on the HDD 114.

Further, the media drive 115 is a device for mounting removable media such as CDs (Compact Discs), MOs (Magneto-Optical discs), DVDs (Digital Versatile Discs) etc. and accessing the data recording surfaces of these media. Removable media is used to move data and programs between devices. It is possible to install application programs for, for example, communication applications, observing and holding user operations of the SyncTap button, and searching for communication counterparts sharing user information for the SyncTap buttons in a data communication apparatus 100 via a portable media.

An example of the data communication apparatus 100 shown in FIG. 2 would be a personal computer that is an IBM USA personal computer "PC/AT (Personal Computer/Advanced Technology)—compatible computer, or one of its successors, etc. It is also possible to use information processing terminals equipped with other architecture, such as, for example, information apparatuses such as PDAs or mobile telephones or digital cameras etc., or information appliances such as televisions or audio-visual recording/reproduction devices as the data communication apparatus 100 of this embodiment.

B. Making Network Connections Using the SyncTap Operation

The mechanism for making network connections can be configured in an extremely straightforward manner based on the SyncTap button operation shown in FIG. 1. For example, when it is desired to connect a notebook computer and a digital camera over a network, a user simply presses down the SyncTap buttons provided on the respective apparatus at the same time, and releases the pressing of the buttons at the same time. Both of the data communication apparatuses then perform multicast transmission of UDP packets containing the following information in response to the release of the SyncTap buttons.

Time interval from pressing down the SyncTap button to releasing the SyncTap button IP address of transmission source Public key information used for making a secure network connection A first time difference constituted by a time difference of a first time at which a first user operation is carried out at this user interface and a second time at which a second user operation is carried out is acquired at the side of one individual information apparatus performing the connection. Similarly, a second time difference constituted by a time difference of a third time at which a first user operation is carried out at this user interface and a fourth time at which a second user operation is carried out is acquired at the side of the other individual information apparatus performing the connection. The physical user operations applied to the user interfaces of the respective information apparatus are a series of operations carried out by the user. The synchronism involved therefore contains a certain degree of error, with timing information being shared between the first and second information apparatus. Connections are therefore established between the information apparatus based on the first and second time differences.

The UDP (User Datagram Protocol) is well known in the industry together with the TCP (Transmission Control Protocol) as an Internet standard transport layer protocol. With the TCP, communication starts from establishing a session, while with the UDP, data is sent to an address when there is no probability of a session. According to UDP packet transmission, protocol processing takes place at high-speed, but error correction and retransmission functions are not present.

By transmitting those kinds of UDP packets by multicasting, all of the surrounding apparatus (this is not limited to apparatuses for which the user has operated the SyncTap button) is able to receive and process multicast packets using specific UDP ports. At both of the apparatuses for which the SyncTap buttons have been operated, when packets are received, timing information relating to user operation of a SyncTap button possessed by an individual apparatus itself and timing information relating to user operations of a SyncTap button included in a packet are compared, and apparatus can determine whether or not a network connection request has taken place to itself.

Figure 3:
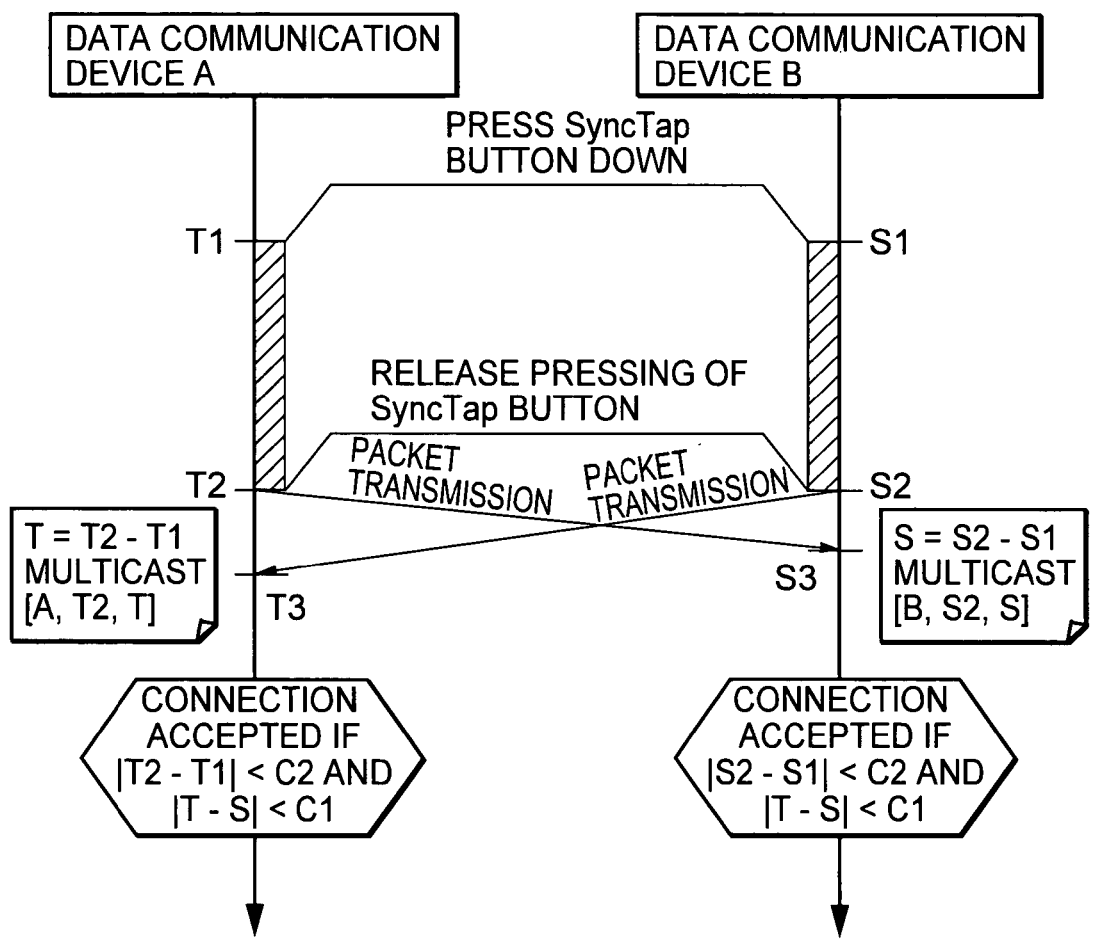
FIG. 3 is a view showing an operation sequence for making a network connection between data communication apparatus A and data communication apparatus B by utilizing a data communication method according to a preferred embodiment of the present invention.

An operation sequence for making a network connection between data communication apparatus A and data communication apparatus B by utilizing a data communication method relating to this embodiment is shown in FIG. 3.

When a user then intends to establish a network connection between data communication apparatus A and data communication apparatus B, the SyncTap buttons of both apparatuses are then simultaneously pressed down and this pressing down is simultaneously released.

In this preferred embodiment, it is not necessary for the system timers of data communication apparatus A and data communication apparatus B to be synchronized. In other words, it is necessary to synchronize operations with respect to the SyncTap buttons of both apparatuses but it is acceptable for observations to take place at times that are different for each individual apparatus. In the example shown in FIG. 3, the data communication apparatus A records a time of pressing down of its own SyncTap button as T1, and a time of releasing of pressing as T2. Further, the data communication apparatus B records a time of pressing down of its own SyncTap button as S1, and a time of releasing of pressing as S2.

In response to releasing of the SyncTap button, the data communication apparatus A performs a multicast transmission of a packet requesting a network connection in accordance with the UDP protocol. An own IP address (taken here to be "A"), time T2 when pressing of the SyncTap button is released, and time period T from when the SyncTap button is pressed down to when pressing is released (=T2−T1) are included in this packet.

Further, in response to releasing of the SyncTap button, the data communication apparatus B also performs a multicast transmission of a packet requesting a network connection in accordance with the UDP protocol. An own IP address (taken here to be "B"), time S2 when pressing of the SyncTap button is released, and time period S from when the SyncTap button is pressed down to when pressing is released (=S2−S1) are included in this packet.

A packet transmitted by multicasting from data communication apparatus A reaches data communication apparatus B constituting a communication counterpart at time S3, and a packet transmitted by multicasting from data communication apparatus B reaches data communication apparatus A constituting a communication counterpart at time T3.

Checks are then made at the data communication apparatus A and the data communication apparatus B as to whether or not arriving packets are network connection requests regarding themselves by comparing the following items.

A locally held SyncTap button pressing release time and a packet arrival time

A locally held time period from pressing down the SyncTap button to releasing the button from pressing and a time interval from pressing down a SyncTap button to releasing the SyncTap button from pressing included in the packet Differences occur in the times for pressing down the SyncTap buttons and times for releasing the SyncTap buttons at each individual apparatus due to network delay times and the precision of operations carried out by people, etc. In this preferred embodiment, C1 and C2 (fixed values) are introduced as limit of errors. C1 is the permitted range of synchronicity for the time interval for a user to simultaneously press down and simultaneously release the pressing down of the SyncTap buttons of the two devices using both hands. C2 is the permitted range of synchronicity for the time of simultaneously releasing pressing down after a user simultaneously presses down the SyncTap buttons of the two devices using both hands. It is preferable for these limit of errors C1 and C2 to be in the order of, for example, 100 to 200 milliseconds.

The data communication apparatus A then checks whether or not a time difference |T3−T2| from a time (T2) from when the SyncTap button on its own device is released until a time (T3) when a packet is received is less than the limit of error C2, and whether or not a time difference |T−S| for a locally held time interval T from pressing down of a SyncTap button until the pressing down is released and a time interval S from the pressing down of a SyncTap button until the pressing down is released included in the packet is the limit of error C1.

The data communication apparatus B then checks whether or not a time difference |S3−S2| from a time (S2) from when the SyncTap button on its own device is released until a time (S3) when a packet is received is less than the limit of error C2, and whether or not a time difference |T−S| for a locally held time interval S from pressing down of a SyncTap button until the pressing down is released and a time interval T from the pressing down of a SyncTap button until the pressing down is released included in the packet is the limit of error C1.

If the differences between the times from the SyncTap buttons being released to the packets being received and the time intervals from the SyncTap buttons being pressed down to the pressing being released are within the range of the limit of errors, both of the data communication apparatuses A and B identify each other as being communication counterparts designated by the user, and a network connection is established using the IP addresses of the targets included in the packets.

In the network connection method described above, it is not necessary for the system timers to be synchronized for between the apparatus because communication counterparts are identified using differences in time information managed at each individual apparatus, not by using times given at each individual apparatus.

Figure 4:
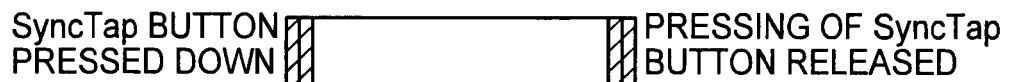
FIG. 4 is a view illustrating a method for identifying communication counterparts in accordance with timing of pressing and releasing of SyncTap buttons.
Figure 4:
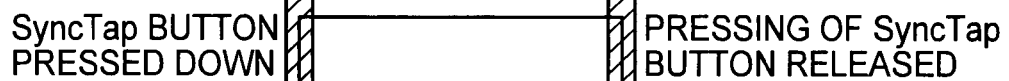
Figure 4:
Figure 4:
Figure 4:
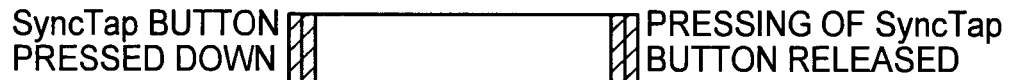
Figure 4:
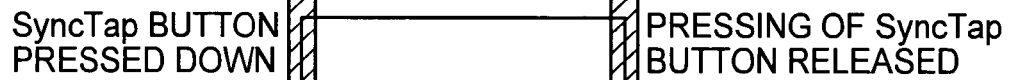
Figure 4:
Figure 4:
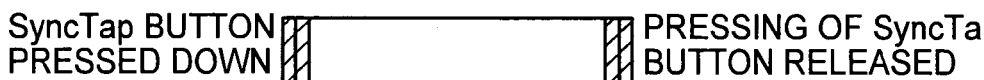
Figure 4:
Figure 4:
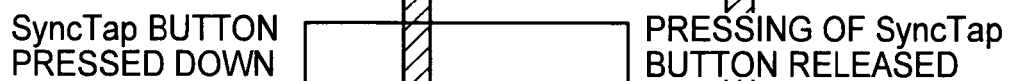
Figure 4:
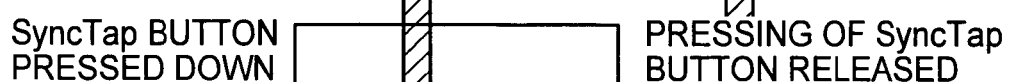

In this preferred embodiment, timing information relating to the pressing and releasing of pressing of SyncTap buttons is exchanged between data communication apparatuses using multicast packet transmission so as to enable identification of network connection requests based on the sameness of this timing information. A method for identifying communication counterparts in accordance with timing of pressing and releasing of SyncTap buttons is illustrated in FIG. 4.

In an example shown in FIG. 4(a), a network connection request is accepted because the timings of the Sync Tap buttons being pressed down (pressed) and the timings of the pressing being released (released) both coincide between two data communication apparatuses.

Further, in the example shown in FIG. 4(b), the timing of the releasing of pressing of the SyncTap buttons coincides between the two data communication apparatuses, but the timing of pressing is different, and the network connection request is therefore not accepted.

Further, in an example shown in FIG. 4(c), a network connection request is not accepted because the timings of the Sync Tap buttons being pressed down (pressed) and the timings of the pressing being released (released) coincide between three data communication apparatuses, but this is regarded to be a communication collision.

Moreover, in the example shown in FIG. 4(d), there are two combinations for which the timings of the pressing and releasing of pressing of the SyncTap buttons coincide for the data communication apparatuses. In such case, network connection requests are accepted for these respective combinations.

Figure 5:
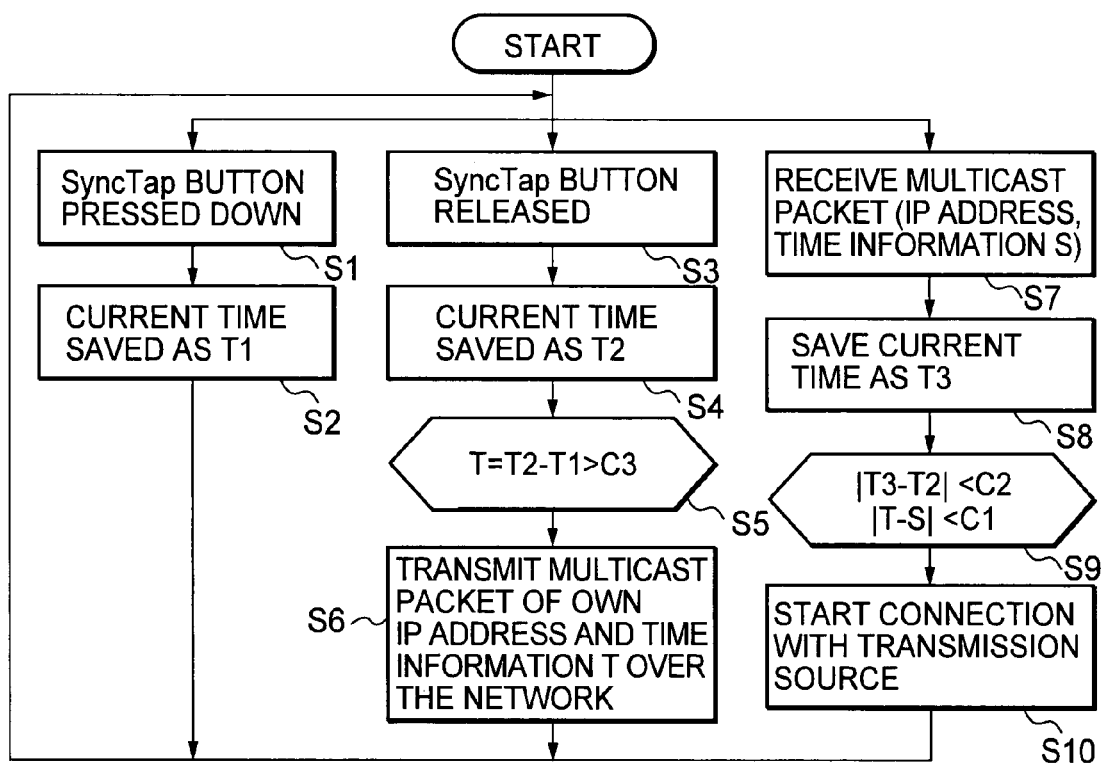
FIG. 5 is a flowchart showing the processing operation taking place at the data communication apparatus for carrying out the network connection shown in FIG. 3.

FIG. 5 shows the processing operation taking place at the data communication apparatus for carrying out the network connection shown in FIG. 3 shown in the form of a flowchart.

First, when a SyncTap button is pressed down, in step s1, the current time is saved as pressing time T1, in step s2.

When pressing of the SyncTap button is then released, in step s3, the current time is saved as releasing time T2, in step s4.

Next, time T(=T1−T2) from the SyncTap button being pressed down to the pressing being released is calculated, and it is confirmed whether or not this time T is greater than a prescribed value C3, in step s5. An own IP address and a network connection request packet containing time information T relating to user operation of the SyhcTap button are then transmitted over the network by multicasting, in step s6.

The SyncTap button may be newly provided on the apparatus or an existing user interface device may be used as in the case of using a specific button (Esc key or Shift key etc.) on a keyboard connected to a personal computer. For example, in the case where an Esc key is allocated as the SyncTap button, when the Esc key is promptly pressed and then released, this may be processed as a normal typing operation. However, when the time interval until the pressing is released exceeds a prescribed value, this may be processed as a SyncTap button operation, with the time of pressing the Esc key and the time or releasing the pressing being handled as T1 and T2 respectively (described later).

On the other hand, when a packet transmitted by multicasting from another data communication apparatus is received, in step s7, a transmission source IP address and time information S relating to user operations of the SyncTap button are extracted from the packet. Further, the packet receiving time is saved as T3, in step s8. A check is then made as to whether or not a time difference |T3−T2| from a time (T2) from when the SyncTap button on its own device is released until a time (T3) when a packet is received is less than the limit of error C2 (|T3−T2|<C2), and whether or not a time difference |T−S| for a locally held time interval T from pressing down of a SyncTap button until the pressing down is released and a time interval S from the pressing down of a SyncTap button until the pressing down is released included in the packet is the limit of error C1 (|T−S|<C1) (step s9). When the results of the determination are affirmative, the presence of a communication counterpart designated by the user is identified, and a network connection is established using the IP address of the communication counterpart included in the packet, in step s10.

The processing of step s7 to step s10 may be limited to being activated only in the case of transmission of multicast packets requesting an own connection.

C. SyncTap Button Key Allocation

The network connection mechanism utilizing the SyncTap button described above assumes that each individual apparatus is equipped with a network connection function and at least one operable button. The SyncTap button may be newly provided on the apparatus or an existing user interface device may be used as in the case of using a specific button (Esc key or Shift key etc.) on a keyboard connected to a personal computer. Alternatively, this may be mounted as a button on the GUI screen. It is also possible to configure packets not just by pressing and releasing a single button one time, but also by pressing and releasing a button a plurality of times, or by using an operation sequence for a plurality of buttons (for example, the case of pressing the "A" key and the "ESC" key in succession may be used as a SyncTap button operation).

For example, when the Esc key to which the SyncTap button is allocated is pressed down and is promptly (for example, within 500 milliseconds) released, this is processed as a normal typing operation. When a time interval from pressing down the Esc key to releasing the pressing exceeds a predetermined value, this is processed as a SyncTap button operation.

Similarly, when the Shift key is allocated as being the SyncTap button, a SyncTap button operation is detected according to whether or not this is a normal Shift key operation. Namely, when the Shift key is pressed down and this pressing is then released without this being in combination with any other key, this is processed as a SyncTap button operation, but in cases other than this (for example, when the shift key is pressed independently for a long time), this is processed as a usual Shift key operation.

D. Collision Detection

There are also cases where an attempt is made to start a separate network connection by another combination of devices while a certain two data communication apparatuses are carrying out a network connection. In such case, another SyncTap multicast packet is transmitted.

As shown in FIG. 4(c), with the data communication system of this embodiment, collision detection is carried out by collecting all multicast packets arriving within a certain time interval from releasing the SyncTap button on an own device. A data communication apparatus then assumes that a collision has occurred when two or more multicast packets arrive within a prescribed time from releasing the SyncTap button.

The network connection method of this preferred embodiment employs multicasting in connection requests. A similar multicast packet is therefore transmitted when a third party attempts to make a separate connection at the same time. For example, if it is intended to connect data communication apparatus A and data communication apparatus B, in cases where a data communication apparatus C and a data communication apparatus D attempt to connect with each other in the same communication range at exactly the same time, it is necessary to guarantee that data communication apparatus A and data communication apparatus C (or data communication apparatus B and data communication apparatus D) are not connected to each other.

In this preferred embodiment, synchronicity is measured for two times of the time of pressing down the SyncTap button and the time of releasing the SyncTap button so that the likelihood of connection with a third party being at exactly the same time is sufficiently low. Further, when an attempt at reconnection is made after detecting a collision, only the transmission source of the multicast packet received in the connection for the first time is limited to being the connection candidate so as to avoid collisions with connection packets from further sites on the second time (or more).

After a collision occurs, a user is invited to again push down the SyncTap button so as to retry the network connection request.

The data communication apparatus stores all of the IP addresses included in each multicast packet when collisions are detected. Only multicast packets from transmission sources having IP addresses that are already registered are accepted when network connection requests are retried.

Figure 6:
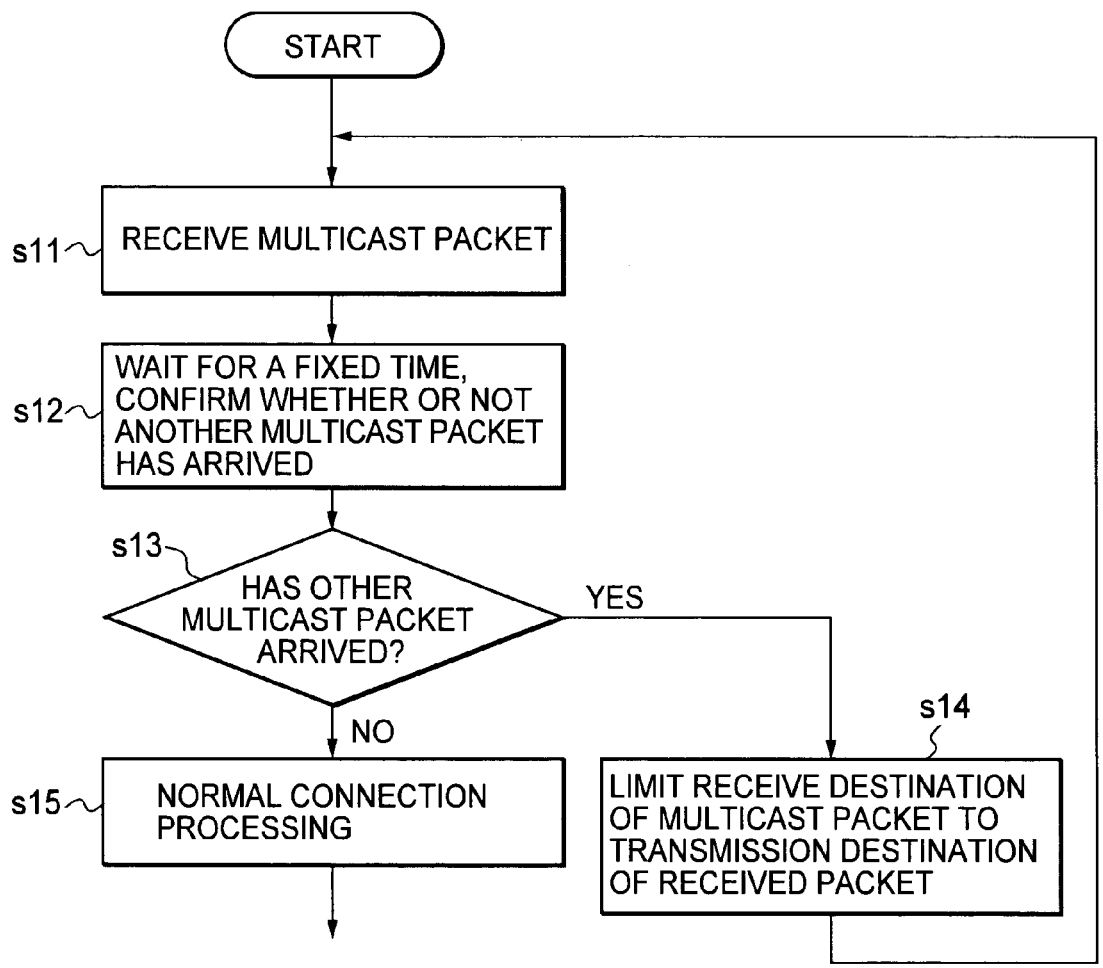
FIG. 6 is a flowchart showing a processing procedure for collision detection and collision avoidance for when data communication apparatuses are attempting to make a network connection.

A processing procedure for collision detection and collision avoidance for when data communication apparatuses are attempting to make a network connection is shown in FIG. 6 in the form of a flowchart. This processing procedure is, for example, incorporated into processing for receiving multicast packets in, for example, step s7 of the processing operation shown in FIG. 5.

When a multicast packet is received, in step s11, this is held for a fixed time, and it is ascertained as to whether or not another multicast packet has arrived during this time, in step s12.

In cases where another multicast packet has arrived, the receive destination of the multicast packet is limited to the transmission source of the received packet (step s14), step s11 is returned to, and retransmission of the multicast packet is awaited.

On the other hand, when another multicast packet is not received within a fixed time, step s15 is proceeded to, and the normal connection processing shown in steps s8 to s10 of FIG. 5 is carried out.

Figure 7:
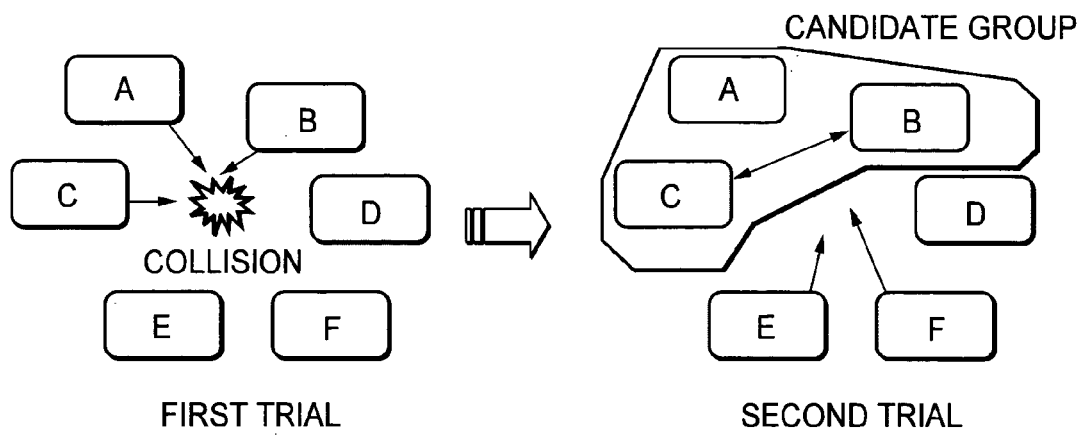
FIG. 7 is a view showing the situation for reattempting network connection requests after detecting a collision.

The situation for reattempting network connection requests after detecting a collision is shown in FIG. 7. In the example shown in FIG. 7, six data communication apparatuses A to F operate in a certain communication environment. Here, it is presupposed that three data communication apparatuses A to C carry out transmission of multicast packets requesting network connections within a certain time.

As a result, establishment of the network connection fails due to the collision detection but each data communication apparatus A to C extracts and stores the IP addresses from the received multicast packets. As a result, the data communication candidates A to C are then identified as a candidate group at the time of re-attempting mutual network connection. Therefore, even if multicast packets are transmitted from the data communication apparatus E and F other than the data communication apparatuses A to C at during retrying, these are ignored within the candidate group.

According to this collision detection/collision avoidance method, even if a SyncTap operation for a first time fails because of a collision with another network connection establishment operation, at the time of a second attempt, the connection destination candidates have already been dramatically reduced (limited to the message transmission sources of the first time), so that a practically collision-free situation is attained. Network connections performed by the SyncTap operation are therefore scaleable and are applicable to communication environments where a large number of data communication apparatuses are clustered on a single LAN segment.

Assuming a situation where a malicious site (computer) attempts to deliberately jam a network by transmitting a large quantity of multicast packets, it is possible to detect the presence of collisions. It is therefore possible to specify an offender perpetrating a usual DOS (Denial of Service) attack using the same techniques and therefore take the countermeasure of cutting the offender off from the network.

E. Secure Communication

In wireless networks the danger of interception is high compared to that of wired networks and it is therefore necessary to protect transmission paths. This is particularly the case for public wireless networks such as the so-called hotspots.

It is possible to utilize the aforementioned SyncTap operation in order to generate shared session keys for secure communication by transmitting Diffie-Hellman public keys using a piggy-back method using multicast packets. The Differ-Hellman public key method is disclosed in the specification of U.S. Pat. No. 4,200,770 and in the specification of U.S. Pat. No. 4,218,582, and the content of these specifications is taken to be incorporated in this specification.

Each data communication apparatus constituting a communication counterpart generates a respective public key suited to being exchanged using multicast packets. These public keys are used in calculating shared secret session keys used in encrypted communication.

Figure 8:
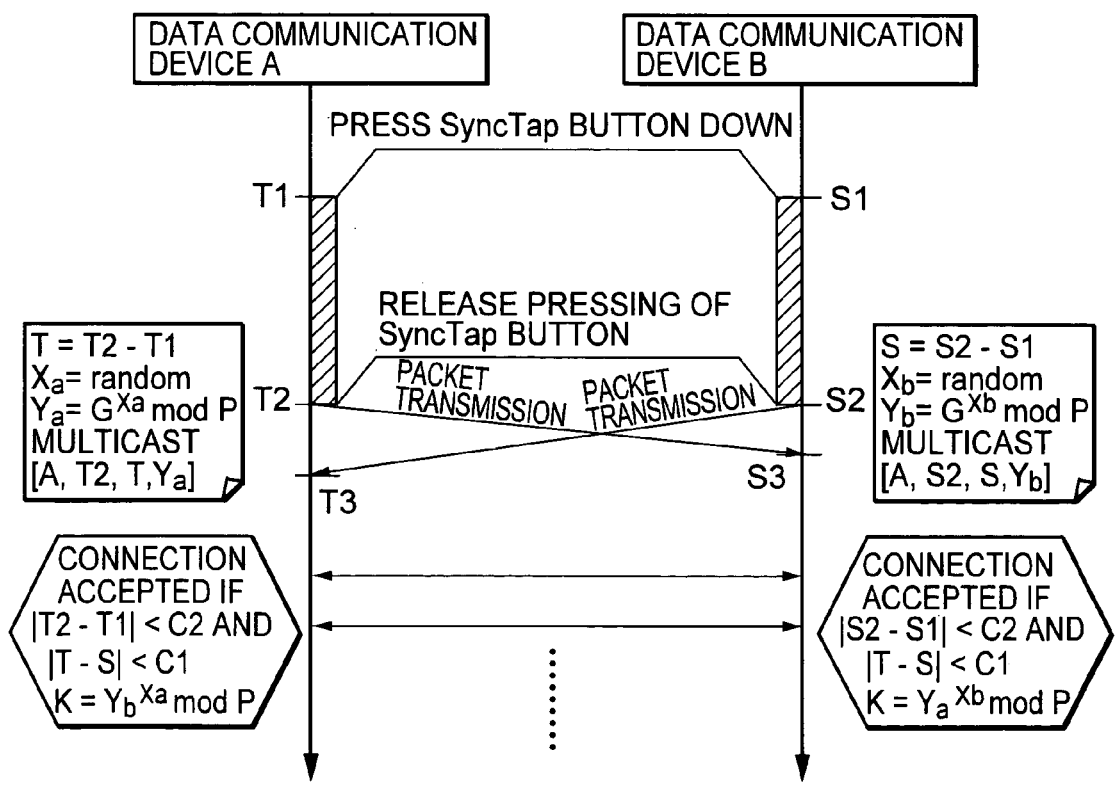
FIG. 8 is a view showing an operation sequence for exchanging public keys when making a network connection between data communication apparatus A and data communication apparatus B by utilizing a data communication method according to a preferred embodiment of the present invention.

An operation sequence for exchanging public keys when connecting data communication apparatus A and data communication apparatus B over a network by utilizing a SyncTap operation is shown in FIG. 8.

When a user then intends to establish a network connection between data communication apparatus A and data communication apparatus B, the SyncTap buttons of both apparatuses are simultaneously pressed down and this pressing down is simultaneously released. At this time, the data communication apparatus A records a time of pressing down of its own SyncTap button as T1, and a time of releasing of pressing as T2. Further, the data communication apparatus B records a time of pressing down of its own SyncTap button as S1, and a time of releasing of pressing as S2.

The data communication apparatus A generates a random number Xa as type information, and generates a public key Ya($=G^{Xa}$ mod P) utilizing this random number Xa. Further, in response to releasing of the SyncTap button, the data communication apparatus A also performs a multicast transmission of a packet requesting a network connection in accordance with the UDP protocol. An own IP address (taken here to be "A"), time T2 when pressing of the SyncTap button is released, time period T($=T2-T1$) from when the SyncTap button is pressed down to when pressing is released, and public key Ya are included in this packet.

The other data communication apparatus B also generates a random number Xb as type information, and generates a public key Yb($=G^{Xb}$ mod P) utilizing this random number Xb. Further, in response to releasing of the SyncTap button, the data communication apparatus B also performs a multicast transmission of a packet requesting a network connection in accordance with the UDP protocol. An own IP address (taken here to be "B") time S2 when pressing of the SyncTap button is released, time period S($=S2-S1$) from when the SyncTap button is pressed down to when pressing is released, and public key Xb are included in this packet.

G and P used in the generation of the public keys are constants agreed to in advance between the data communication apparatuses A and B and may be made public.

In addition, a packet transmitted by multicasting from data communication apparatus A reaches data communication apparatus B constituting a communication counterpart at time S3, and a packet transmitted by multicasting from data communication apparatus B reaches data communication apparatus A constituting a communication counterpart at time T3. Check is then made at the data communication apparatus A and the data communication apparatus B as to whether or not arriving packets are network connection requests regarding themselves by comparing the following items.

A locally held SyncTap button pressing release time and a packet arrival time

A locally held time period from pressing down the SyncTap button to releasing the button from pressing and a time interval from pressing down a SyncTap button to releasing the SyncTap button from pressing included in the packet The data communication apparatus A then checks whether or not a time difference |T3−T2| from a time (T2) from when the SyncTap button on its own device is released until a time (T3) when a packet is received is less than the limit of error C2, and whether or not a time difference |T−S| for a locally held time interval T from pressing down of a SyncTap button until the pressing down is released and a time interval S from the pressing down of a SyncTap button until the pressing down is released included in the packet is the limit of error C1.

The data communication apparatus B then checks whether or not a time difference |S3−S2| from a time (S2) from when the SyncTap button on its own device is released until a time (S3) when a packet is received is less than the limit of error C2, and whether or not a time difference |T−S| for a locally held time interval S from pressing down of a SyncTap button until the pressing down is released and a time interval T from the pressing down of a SyncTap button until the pressing down is released included in the packet is the limit of error C1.

When the differences between the times from the SyncTap buttons being released to the packets being received and the time intervals from the SyncTap buttons being pressed down to the pressing being released are within the range of the limit of errors, both of the data communication apparatuses A and B identify each other as being communication counterparts designated by the user, and a network connection is established using the IP addresses of the targets included in the packets.

Then, the data communication apparatus A generates a shared secret session key K($=Y_b^{Xa}$ mod P) using the random number Xa held by itself and the public key Yb included in the multicast packet from the data communication apparatus B. Further, the data communication apparatus B generates a shared secret session key K($=Y_a^{Xb}$ mod P) using the random number Xb held by itself and the public key Ya included in the multicast packet from the data communication apparatus A.

Encrypted communication is then possible between the data communication apparatuses A and B using the shared secret session keys K. It is therefore possible to enable secret communication in a straightforward manner between two neighboring apparatuses at, for example, a hotspot providing a public wireless Internet connection service, etc.

In the method shown in FIG. 8, when a counterfeit data communication apparatus C is interposed between data communication apparatus A and data communication apparatus B, i.e. when data communication apparatus C pretends to be data communication apparatus B to the data communication apparatus A, and pretends to be data communication apparatus A to the data communication apparatus B, there is risk that communication will be intercepted. Because of this, a method of authenticating a target using PKI (Public Key Infrastructure) is usually adopted after exchanging keys using the Diffie-Hellman method.

The Diffie-Hellman method is a public key distribution system algorithm employing the mathematical assumption that discrete logarithm problems occurring in multiplicative groups in a finite field are difficult as a basis for assuring security. Users employing this method prepare a secret key known only to themselves and a public key calculated from the secret key using numerical operations. A secret key that can then be shared between two people is then calculated by performing operations specified by a users own secret key and a target users public key. The relationship between the secret keys and the public keys is then configured in such a manner as to make it extremely difficult for a third party to perform these calculations. It is therefore not possible to calculate the session key even if the public keys Ya and Yb are intercepted, and it is therefore not possible to decipher the communication content.

The Diffie-Helman algorithm is typically used to resolve the "man-in-the-middle" (anybody can make a connection)

problem, and an additional method is required to verify an end point of the communication path. With respect to this, in order for a "man-in-the-middle", i.e., a third party to get in between in the case of utilizing the SyncTap method described above, it is necessary to block all of the multicast packets and transmit counterfeit packets in their place. This makes impropriety extremely difficult.

Further, because the network connection method employing SyncTap is utilized in connecting between adjoining apparatus (apparatus that can be reached by both hands by the user), the respective apparatuses can easily carry out instantaneous feedback with reference to network connections. For example, a message window may be displayed as a pop-up on a display screen, or an LED indicator may be made to flash. As a result, it becomes easy to detect a concealed man-in-the-middle host. It is therefore possible to obtain sufficient reliability on a realistic communication environment even for a straightforward public key exchanging method.

F. Examples of Application

As described in the above, it is possible to establish network connections between various types of information apparatus in a simple manner using intuitive user operations with the network connection method utilizing SyncTap of this embodiment. The following is a description of applications of this network connection method.

(1) Instant Connections Between Personal Computers and Apparatus

Here, it is presumed that there is a digital camera capable of being connected to a wireless network. Then, after taking several photographs, it is presupposed that photographed images are transferred to a notebook computer.

In such case, the user presses down a camera shutter button and a notebook computer Shift key allocated as being SyncTap buttons at the same time, and releases pressing of these buttons at the same time.

Figure 9:
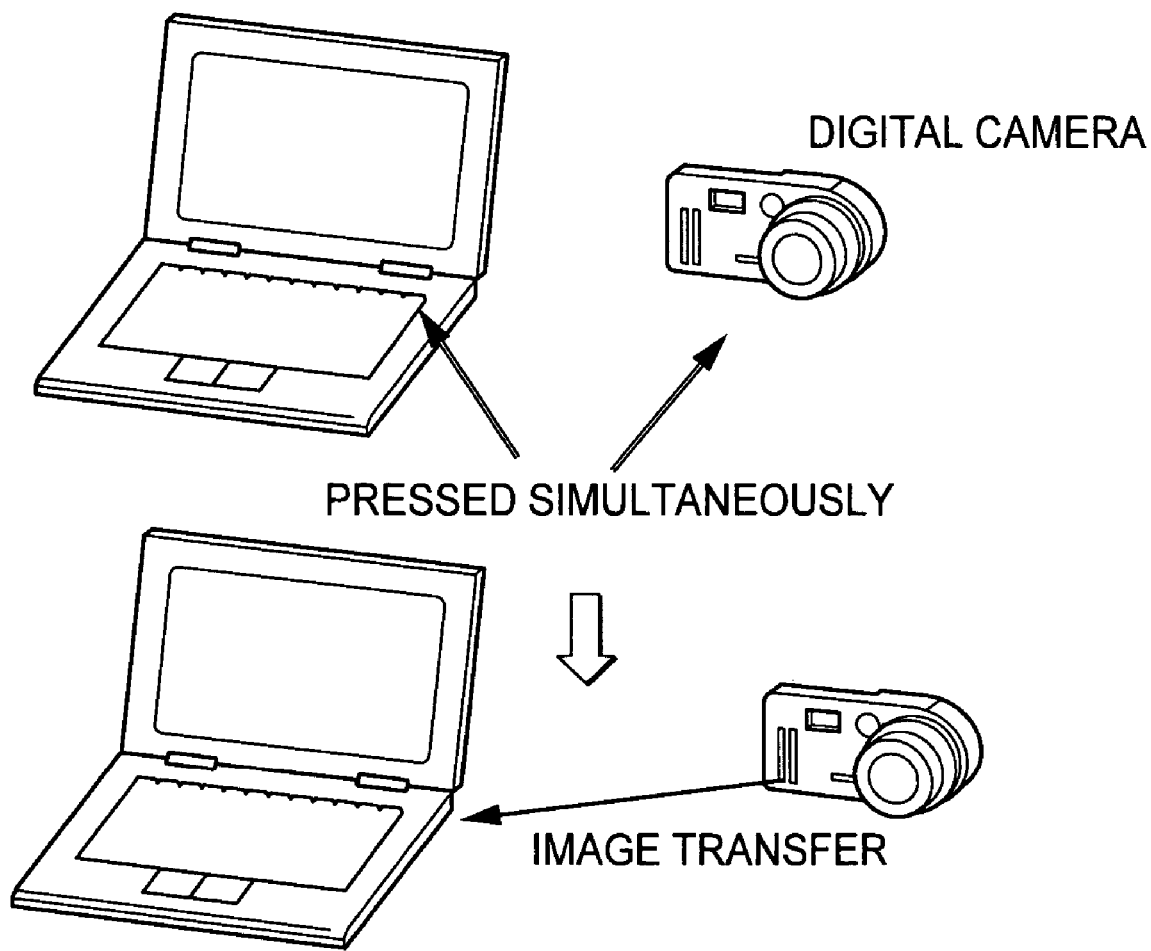
FIG. 9 is a view showing a situation of making an Internet connection between a personal computer and an individual apparatus using SyncTap.

In response to that, a wireless network is established between the notebook computer and the digital camera. After that, a window corresponding to the digital camera appears on the computer screen. The user then drags image files from this window to a document folder on the computer side. In response to that, processing of transferring the image files from the digital camera to the notebook computer is started up (refer to FIG. 9).

Figure 10:
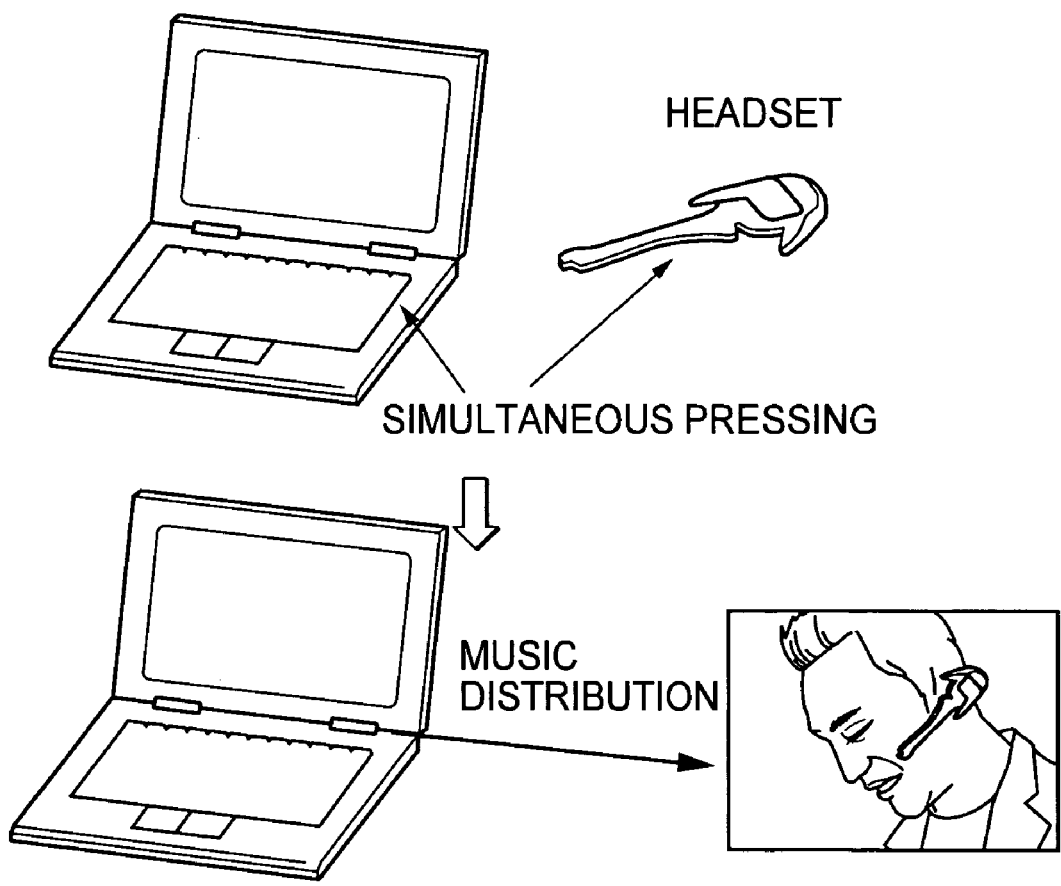
FIG. 10 is another view showing a situation of making an Internet connection between a personal computer and an individual apparatus using SyncTap.

Moreover, in cases where it is desired to connect notebook computers with a peripheral apparatus such as a wireless mouse or a headset etc., the SyncTap buttons of the computer and peripheral apparatus that constitutes the connection destination are pushed down at the same time and released at the same time. As a matter of course, in cases where it is desired to connect the computer to a television set, to a video recording/reproduction apparatus, to an AV apparatus or to other household appliances, then the SyncTap buttons of the computer and the household apparatus that is the connection destination are similarly pushed down simultaneously and released simultaneously. Streaming distribution then commences from the computer after the connection is established, and content playback can be carried out by the household appliance (refer to FIG. 10).

(2) Ad Hoc Connection at Hotspots and in Conference Rooms

It is presupposed that a user utilizes a hot spot service in a shared lounge. It is also taken that file exchanging is to take place with a person you are sitting with. In this kind of situation, a user simultaneously presses down SyncTap buttons of both personal computers and simultaneously releases the buttons. In response to that, a network connection is established between the computers.

Figure 11:
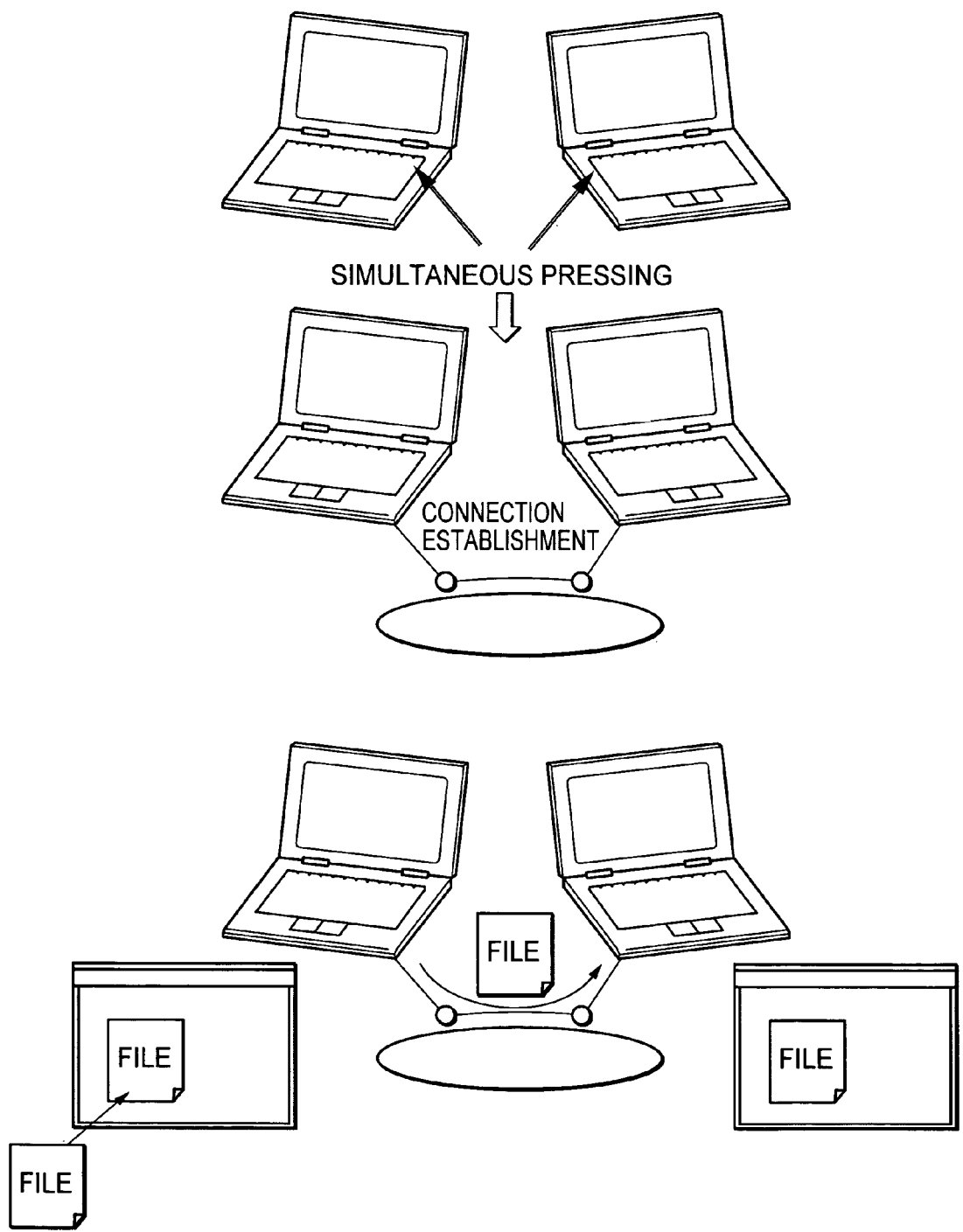
FIG. 11 is a view showing a situation of making an Internet connection between personal computers using SyncTap.

When a network connection is established, file exchange windows are displayed on the respective computer screens. A user may then start up file transfer processing between the computers by dragging a file it is desired to transfer into the file exchange window on the side of the computer constituting a file transfer source (refer to FIG. 11).

It is then possible to begin secure data transfer by exchanging public keys for the Diffie-Hellman method between the computers (described above).

(3) Printing

For example, it is presupposed that it is desired to print out documents stored on a PDA in the possession of a user on a printer located in the vicinities. In this kind of situation, a user simultaneously presses down SyncTap buttons of both apparatuses and simultaneously releases the buttons. In response to that, a network connection is established between the PDA and the printer.

Figure 12:
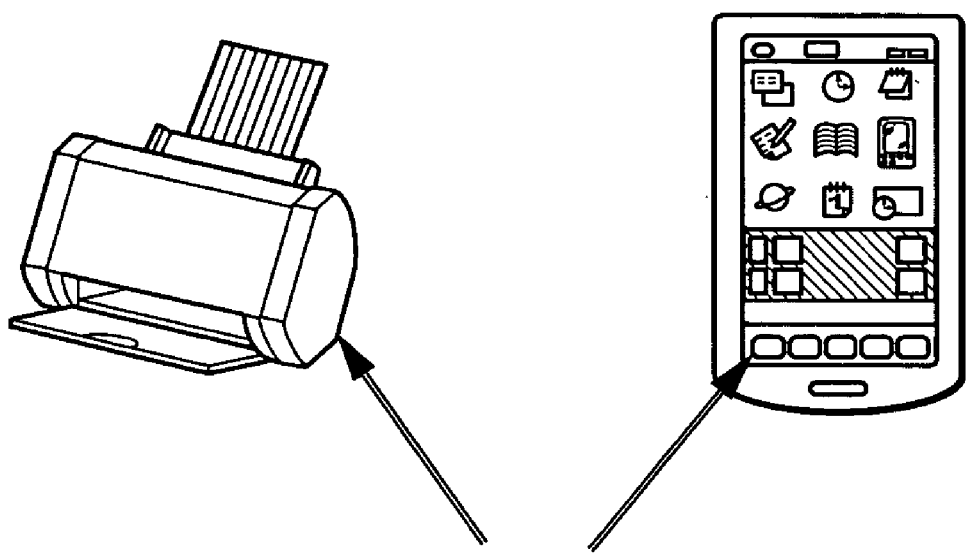
FIG. 12 is a view showing a situation of making an Internet connection between a printer and a PDA using SyncTap.
Figure 12:
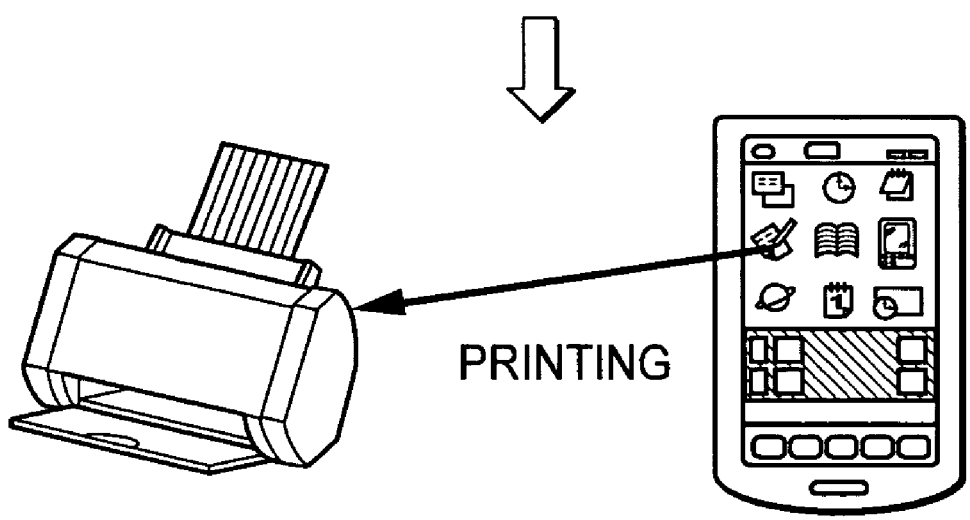

A printer icon then appears on the PDA screen. The user can then start up the print out operation by dragging a document item on the PDA screen to a printer icon (refer to FIG. 12). In such case, the printed document content itself continues to be maintained in flash memory within the PDA or the PDA simply manages a link (URL etc.) to the document.

(4) Presentation

It is presupposed that it is desired to carry out a presentation using slides in a meeting room etc. At this time, a person giving the presentation transfers slide data from their own computer to a presentation computer using a wireless network. In this kind of situation, SyncTap buttons of both computers are simultaneously pressed down and simultaneously released. The SyncTap button on the presentation computer side is allocated to a remote control button for slide use. The presentation computer receives an infrared beam from the remote control unit and establishes a network connection between the computers.

As shown in this example, applications of SyncTap are not limited to two apparatuses that a user can reach with both hands. It is also possible to use an intermediary device such as an infrared remote control unit of a simple configuration as a remote SyncTap button. In such case, an infrared beam (remote control signal) is emitted towards the target apparatus at a time when a SyncTap button incorporated into an infrared remote control unit is pressed. A time when the SyncTap button is pressed down and a time when pressing of the SyncTap button is released are acquired using these times on the target apparatus side and a multicast packet requesting a network connection is transmitted.

The remote control unit is used with the purpose of simply transmitting the times of pressing down and releasing of pressing down of a button, and is in no way required to transmit complex data to the communication counterpart using an infrared beam. It is not necessary for address information and authentication information for the target apparatus to be included in the remote control signal.

Figure 13:
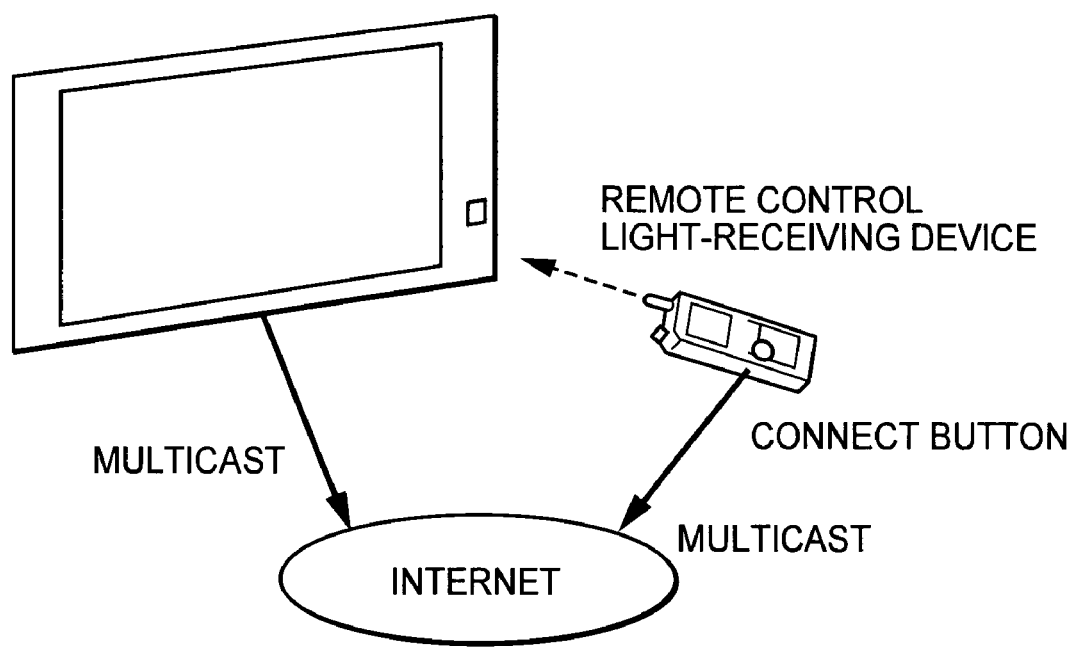
FIG. 13 is a view showing a situation of making an Internet connection using SyncTap using a remote control unit.

When the pressing of a SyncTap button on a PDA is continued in the case of using a PDA as a remote control unit, a multicast packet and a remote control signal are simultaneously emitted (refer to FIG. 13).

Figure 14:
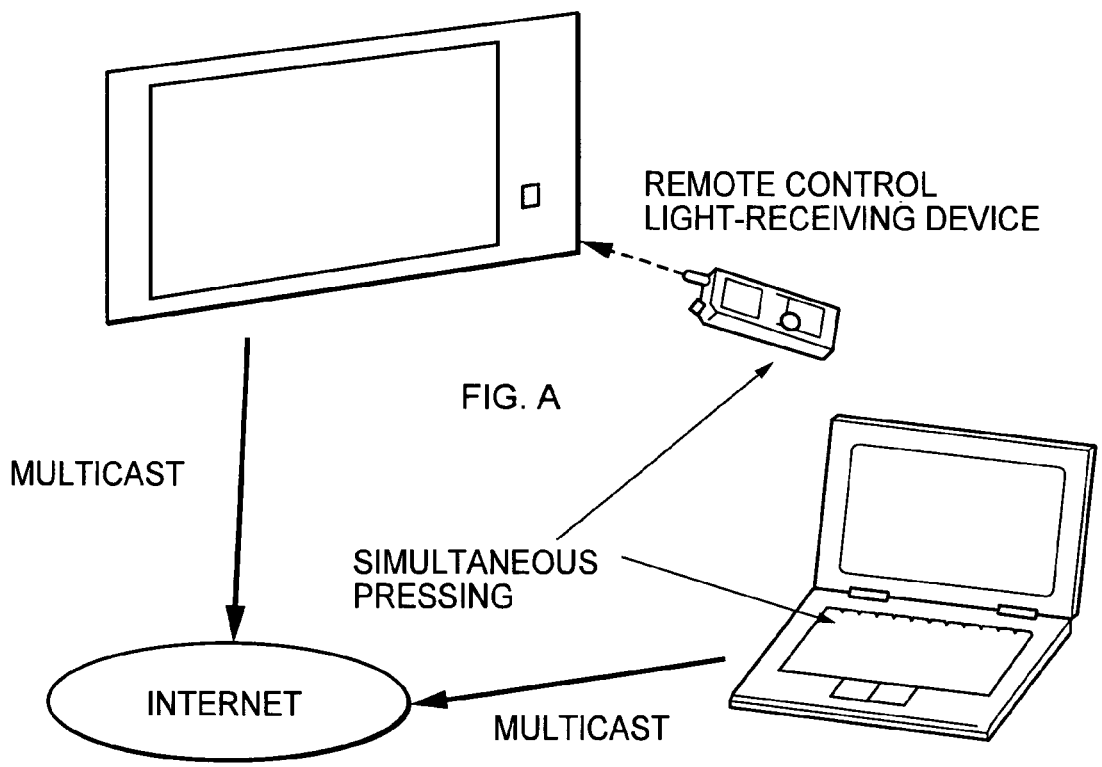
FIG. 14 is another view showing a situation of making an Internet connection using SyncTap using a remote control unit.
Figure 15:
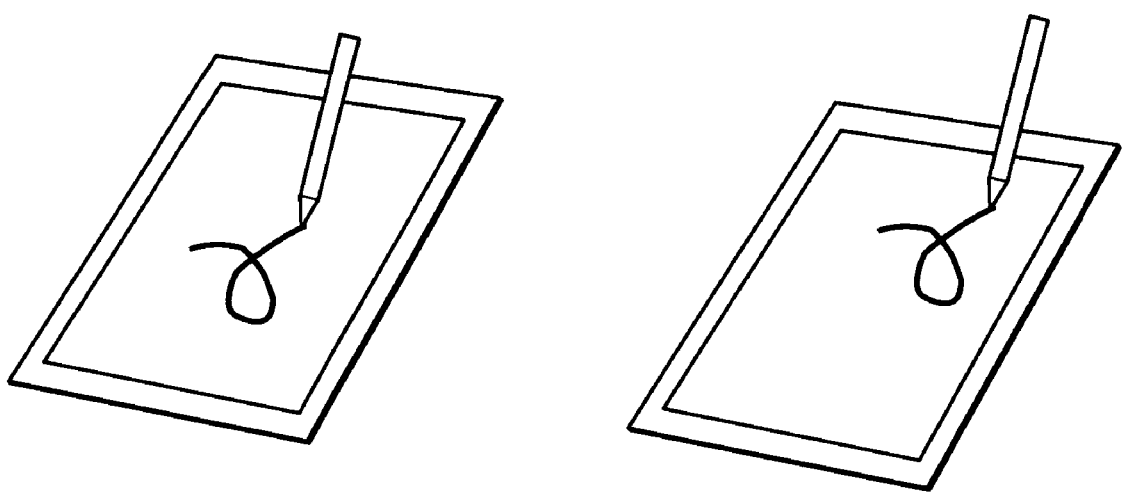
FIG. 15 is a view showing a situation for implementing a SyncTap operation using pen strokes at a pen input-based computer.

When it is desired to make a connection between a notebook computer and a television set, to a video recording/reproduction apparatus, to an AV apparatus or to other household appliances capable of being operated by remote control, then as described above, the SyncTap buttons of the computer and the remote control unit of the household appliance are pressed down simultaneously and released simultaneously (refer to FIG. 14). After a network connection is established, it is possible, for example, to have AV content stored in a computer to be transferred to a television screen, or for a hard disc recorder to be accessed via a computer screen so as to program recording of a program.

A Pick-and-Drop pen may be given as an example of an intermediary device other than an infrared remote control unit capable of functioning as a remote SyncTap button. A Pick-and-Drop pen is mainly for handling data but may also handle network connections as an intermediary device. Related reference may be found in, for example, "Pick-and-Drop: A Direct Manipulation Technique for Multiple Computer Environments." (In Proceedings of UIST'97 (1997) pp. 31-39) by Rekimoto et. al, with regard to a Pick-and-Drop pen.

(5) Establishment of Communication using a HyperCursor

A moveable cursor system has been implemented referred to as a "HyperCursor" as one function of an Augmented Surface (extended desktop) system. By using a HyperCursor, is it possible to operate two computers using a single mouse and keyboard. When the cursor reaches the edge of one computer screen, the cursor automatically jumps over to the other computer screen. Keyboard input is also delivered to the two computers. A user is able to drag objects from one computer to the other computer through the boundaries of the computer screen.

An original hyper-drag system was configured based on camera sensors for identifying the positions of each computer. Movement of the mouse in logical space is reflected in physical placement on the respective computer screens. It is therefore possible to achieve spatial continuity of the object operation based on sensor output. For example, the configuration is such that when a second computer is arranged to the left side of a first computer, the cursor jumps from the left end of the screen of the first computer to the screen of the second computer. However, when there is no camera sensor system, it is necessary for a user to configure a desktop environment corresponding to the HyperCursor using a manual operation. Such operation is particularly troublesome in cases where the computers adopt automatic IP address allocation based on DHCP etc.

Problems in the case where HyperCursor and SyncTap are combined but a sensor system is not provided will now be considered. For example, let it be assumed that a user brings a tablet-type computer that does not have a keyboard to an office desk so as to operate the tablet computer using a keyboard and mouse connected to a desktop computer. In such case, the user simply has to simultaneously press down and simultaneously release pressing down of SyncTap buttons of the respective computers (An escape key or Shift key is allocated as the SyncTap button for the desktop computer, while a SyncTap button is mounted for the tablet computer by tapping on the screen). In response to that, a network connection is established between the computers. Next, the user starts an operation to strike the edge of the screen on the side of the desktop computer. As a result of such operation, the relative position of the table computer is instructed to the system, and the cursor jumps to the screen of the tablet computer.

Other methods for specifying physical placement by selecting SyncTap buttons have been tried. For example, a case in which the system side is notified that another apparatus is arranged on the left side by operating a left side shift key.

Related reference is available, for example, in paper "Augmented Surface: A spatially continuous workspace for hybrid computing environment" (In Proceedings of ACM CHI'99. (1999) pp. 378-38) by Rekimoto et. al., with reference to HyperCursors.

(6) SyncTap for a Pen-input-based Computer

In the case of using a computer with a full keyboard, it is possible to configure a SyncTap button from specific operations of, for example, and ESC key or a Shift key, or have a combination of operations of these keys and usual character keys (described previously). With reference to that, in the case of a pen input computer that does not possess any particular keys or buttons, it is possible to allocate a specific pen stroke as the SyncTap button operation.

For example, the timing of downstroke of a pen (i.e. the start of a stroke) and the timing of an upstroke of a pen may be used. Further, attribute information such as length, direction and shape etc. of a pen stroke may be attached to a packet and then transmitted.

As a result, when a plurality of SyncTap packets arrive at the same time, it is possible to selectively connect only to senders of packets having strokes of similar shapes, so as to appropriately avoid erroneous connections and collisions.

In the above, a detailed description is given to the present invention while referring to specific preferred embodiments thereof. However, it is evident that various modifications, combinations, sub-combinations, substitutions etc. may be made to the preferred embodiments without departing from the scope of the present invention.

In this specification, description is given centered on the case of applying SyncTap technology mainly to establishment of a network connection but SyncTap technology is similarly important to user interfaces after establishment of a network connection. For example, it is also similarly possible to apply SyncTap technology to a situation such as effectively selecting a beneficial operation in a system combining a plurality of apparatuses.

Therefore, the present invention is disclosed in the form of exemplifications, and the present invention must by no means be interpreted or construed as being limited to the content disclosed in this specification.

What is claimed is:

1. A data communication system for enabling a plurality of communication apparatuses to perform data communication via a communication medium, the data communication system comprising:

timing information sharing section configured to share timing information related to a user operation and release of user operation between devices performing mutual communication, in response to user operation and release of user operation performed at a same timing against respective connection designation section of apparatuses constituting respective counterparts for communication; and searching section configured to search over said communication medium and specify as a communication counterpart an apparatus sharing timing information related to said user operation and said release of user operation; wherein each of said communication apparatuses includes a user interface configured to accept a user operation, and said user operation and release of user operation related to part of said user interfaces is allocated to a connection designation section configured to designate network connections, whereby a data communication path between any two of the communication apparatuses is established when the timing of a user performing a manual operation on one of the two apparatuses or on a peripheral device associated with said one of the two apparatuses corresponds to the timing of a user performing a manual operation on the other of the two apparatuses or on a peripheral device associated with said other of the two apparatuses, said communication path being established regardless of whether or not there is synchronization between said one of the two apparatuses, or a peripheral device associated with said one of the two apparatuses, and said other of the two apparatuses, or a peripheral device associated with said other of the two apparatuses, the manual operation comprising operating a key or button that is assigned the function of establishing the communication path and at least one other function.

2. The data communication system according to claim 1, wherein said searching section collectively transmits connection request packets including timings of said user operation and said release of user operation for each of said communication apparatuses; reads timing information related to user operation and release of user operation from a connection request packet received from other apparatuses; and compares said timing information related to user operation and release of user operation with its own timing information of user operation and release of user operation; wherein mutual identification between apparatuses is performed upon matching carried out as a result of said comparison of timing information.

3. The data communication system according to claim 2, wherein said connection request packet further comprises time interval between user operation and release of user operation and network identification information of a transmitting counterpart.

4. The data communication system according to claim 2, wherein said connection request packet further comprises key information to be used for establishing network connection.

5. A data communication apparatus for performing data communication via a communication medium, comprising:

user interfaces configured to accept user operation;

connection designation section configured to designate network connection for user operation and release of user operation allocated to part of said user interfaces;

timing information storage section configured to store timing information related to said user operation and release of user operation, in response to said user operation and release of user operation against said connection designation section; and searching section configured to search over said communication medium and specify as a communication counterpart an apparatus sharing timing information related to said user operation and said release of user operation, whereby a data communication path between the apparatus and the counterpart apparatus is established when the timing of a user performing a manual operation on the apparatus or on a peripheral device associated with the apparatus corresponds to the timing of a user performing a manual operation on the counterpart apparatus or on a peripheral device associated with the counterpart apparatus, said communication path being established regardless of whether or not there is synchronization between the apparatus, or a peripheral device associated with the apparatus, and the counterpart apparatus, or a peripheral device associated with the counterpart apparatus, the manual operation comprising operating a key or button that is assigned the function of establishing the communication path and at least one other function.

6. The data communication apparatus according to claim 5, wherein said searching section comprises:

packet transmitter configured to collectively transmit connection request packets including timings of said user operation and said release of user operation in response to said release of user operation against said connection designation section;

packet receptor configured to receive connection request packets from another data communication apparatus within a time interval from said release of user operation against said connection designation section; and communication counterpart identification section configured to read timing information related to user operation and release of user operation from a connection request packet received from said other communication apparatus; compare said timing information related to user operation and release of user operation stored in said timing information storage section; and perform mutual identification between apparatuses upon matching as a result of said comparison.

7. The data communication apparatus according to claim 6, wherein said connection request packets include one's own network identification information and time interval between user operation and release of user operation.

8. The data communication apparatus according to claim 6, wherein said communication counterpart identification section identifies whether or not a transmission source of a connection request packet constitutes a communication counterpart upon determining whether or not a difference of a time interval from releasing of user operation of said connection designation section of one's own device to a time of receiving a connection request packet is less than a limit of error; and determining whether or not a difference between a time interval from an operation of said connection designation section stored in said timing information storage section to said release of user operation and said time interval included in said received connection request packet constitutes a limit of error.

9. The data communication apparatus according to claim 5, wherein said user operation against said connection designation section is processed as a request for network connection if said user operation against said connection designation section differs from a usual interface operation.

10. The data communication apparatus according to claim 5, wherein said user operation against said connection designation section is processed as a usual interface operation if a time interval from said user operation against said connection designation section to the user releasing said apparatus is less than a limit value, and is processed as a network connection request if said time interval exceeds said limit value.

11. The data communication apparatus according to claim 5, further comprising collision detector configured to detect a collision in response to arrival of two or more connection request packets within a prescribed time from release of user operation against said connection designation section.

12. The data communication apparatus according to claim 11, further comprising connection request retry section configured to request retrial of operation of said connection designation section in response to detection of collision.

13. The data communication apparatus according to claim 12, further configured to store all network identification information included in each connection request packet received at time of collision; and to accept only a connection request packet from a transmission source possessing stored network identification information at time of retrying said connection request.

14. The data communication apparatus according to claim 6, further comprising generator configured to generate a public key under a public key encryption method; wherein
said packet transmitter transmits a connection request packet including said public key.

15. The data communication apparatus according to claim 5, further comprising provider configured to provide feedback to the user in response to identification of a communication counterpart by said communication counterpart identification section.

16. A data communication method for performing data communication via a communication medium, comprising:
Using a processor to perform a connection designation step of designating network connection for user operation and release of user operation against a user interface of an apparatus;
timing information storing step of storing timing information related to said user operation and release of user operation of said connection designation step; and
searching step of searching over said communication medium and specifying as a communication counterpart an apparatus sharing timing information related to said user operation and said release of user operation,
whereby a data communication path between the apparatus and the counterpart apparatus is established when the timing of a user performing a manual operation on the apparatus or on a peripheral device associated with the apparatus corresponds to the timing of a user performing a manual operation on the counterpart apparatus or on a peripheral device associated with the counterpart apparatus, said communication path being established regardless of whether or not there is synchronization between the apparatus, or a peripheral device associated with the apparatus, and the counterpart apparatus, or a peripheral device associated with the counterpart apparatus,
the manual operation comprising operating a key or button that is assigned the function of establishing the communication path and at least one other function.

17. A method of establishing connection between information apparatuses, comprising:
Using a processor to perform a first acquisition step of acquiring a first time difference comprising a difference between a first time on which a first physical operation is carried out on an operation section utilized for operation of a first information apparatus and a second time on which a second physical operation is carried out on said operation section;
second acquisition step of acquiring a second time difference comprising a difference between a third time corresponding to said first time and generated on a second information apparatus, and a fourth time corresponding to said second time; and
connection establishing step of establishing connection between said first and said second information apparatuses based on said first and said second time differences; wherein
said first and said second physical operations comprises a series of operations performed against said operation section,
whereby a data communication path between the first information apparatus and the second information apparatus is established when the timing of a user performing a manual operation on the first information apparatus or on a peripheral device associated associated with the second information apparatus, said communication path being establishing regardless of whether or not there is synchronization between the first information apparatus, or a peripheral device associated with the first information apparatus, and the second information apparatus, or a peripheral device associated with the second information apparatus,
the manual operation comprising operating a key or button that is assigned the function of establishing the communication path and at least one other function.

18. The method according to claim 17, further comprising:
at least one of outputting step of outputting information of a first type for generating an encryption key in perceptible form for said second apparatus, and a third acquisition step of acquiring information of a second type for generating an encryption key outputted by said second information apparatus; and
communication step of performing communication utilizing encryption process based on said encryption key, after establishment of said connection.

19. A method of establishing connection between information apparatuses, comprising:
Using a processor to perform a first acquisition step of acquiring a first time on which a first physical operation is carried out on an operation section utilized for operation of a first information apparatus;
second acquisition step of acquiring a second time on which a second physical operation is carried out on said operation section;
third acquisition step of acquiring a third time and a fourth time corresponding to said first time and said second time, and generated on a second information apparatus; and
connection establishing step of establishing connection between said first and said second information apparatuses based on said first to fourth times; wherein
said first and said second physical operations comprise a series of operations performed against said operation section,
whereby a data communication path between the first information apparatus and the second information apparatus is established when the timing of a user performing a manual operation on the first information apparatus or on a peripheral device associated with the first information apparatus corresponds to the timing of a user performing a manual operation on the second information apparatus or on a peripheral device associated with the second information apparatus, said communication path being established regardless of whether or not there is synchronization between the first information apparatus, or a peripheral device associated with the first information apparatus, and the second information apparatus, or a peripheral device associated with the second information apparatus,
the manual operation comprising operating a key or button that is assigned the function of establishing the communication path and at least one other function.

20. A connection establishing apparatus for establishing connection between information apparatuses, comprising:
operation section configured to enable a user to perform a physical operation;
first acquisition section configured to acquire a first time difference comprising a difference between a first time on which a first physical operation is carried out on said operation section utilized for operation of a first information apparatus and a second time on which a second physical operation is carried out on said operation section;

second acquisition section configured to acquire a second time difference comprising a difference between a third time corresponding to said first time and generated on a second information apparatus, and a fourth time corresponding to said second time; and connection establishing section configured to establish connection between said first and said second information apparatuses based on said first and said second time differences; wherein said first and said second physical operations comprise a series of operations performed against said operation section, whereby a data communication path between the first information apparatus and the second information apparatus is established when the timing of a user performing a manual operation on the first information apparatus or on a peripheral device associated with the first information apparatus corresponds to the timing of a user performing a manual operation on the second information apparatus or on a peripheral device associated with the second information apparatus, said communication path being established regardless of whether or not there is synchronization between the first information apparatus, or a peripheral device associated with the first information apparatus, and the second information apparatus, or a peripheral device associated with the second information apparatus, the manual operation comprising operating a key or button that is assigned the function of establishing the communication path and at least one other function.

21. A computer program written in a computer-readable medium for making a computer execute a process of establishing connections between information apparatuses, the process comprising:

first acquisition step of acquiring a first time difference comprising a difference between a first time on which a first physical operation is carried out on an operation section installed on an apparatus and a second time on which a second physical operation is carried out on said operation section;

a second acquisition step of acquiring a second time difference comprising a difference between a third time corresponding to said first time and generated on an information apparatus constituting a connection counterpart, and a fourth time corresponding to said second time; and connection establishing step of establishing connection between said first and said second information apparatuses based on said first and said second time differences; wherein said first and said second physical operations comprise a series of operations carried out against said operation sections, whereby a data communication path between the apparatus and the counterpart apparatus is established when the timing of a user performing a manual operation on the apparatus or on a peripheral device associated with the apparatus corresponds to the timing of a user performing a manual operation on the counterpart apparatus or on a peripheral device associated with the counterpart apparatus, said communication path being established regardless of whether or not there is synchronization between the apparatus, or a peripheral device associated with the apparatus, and the counterpart apparatus, or a peripheral device associated with the counterpart apparatus± the manual operation comprising operating a key or button that is assigned the function of establishing the communication path and at least one other function.

22. A data communication system for enabling a plurality of communication apparatuses to perform data communication via a communication medium, the data communication system comprising:

timing information sharing means for sharing timing information related to a user operation and release of user operation between devices performing mutual communication, in response to user operation and release of user operation performed at a same timing against respective connection designation section of apparatuses constituting respective counterparts for communication; and searching means for searching over said communication medium and specify as a communication counterpart an apparatus sharing timing information related to said user operation and said release of user operation; wherein each of said communication apparatuses includes a user interface for accepting a user operation, and said user operation and release of user operation related to part of said user interfaces is allocated to a connection designation means for designating network connections, whereby a data communication path between any two of the communication apparatuses is established when the timing of a user performing a manual operation on one of the two apparatuses or on a peripheral device associated with said one of the two apparatuses corresponds to the timing of a user performing a manual operation on the other of the two apparatuses or on a peripheral device associated with said other of the two apparatuses, said communication path being established regardless of whether or not there is synchronization between said one of the two apparatuses, or a peripheral device associated with said one of the two apparatuses, and said other of the two apparatuses, or a peripheral device associated with said other of the two apparatuses, the manual operation comprising operating a key or button that is assigned the function of establishing the communication path and at least one other function.

* * * * *